United States Patent [19]

Banjo et al.

[11] Patent Number: 5,086,866
[45] Date of Patent: Feb. 11, 1992

[54] MOTORCYCLE HAVING BODY HEIGHT ADJUSTOR

[75] Inventors: Tetsuya Banjo; Eiji Iida; Katsuhiko Tokunaga; Satoshi Kiyota, all of Shizuoka, Japan

[73] Assignee: Suzuki Kabushiki Kaisha, Kamimura, Japan

[21] Appl. No.: 603,120

[22] Filed: Oct. 25, 1990

[30] Foreign Application Priority Data

Oct. 26, 1989 [JP] Japan .................. 1-277154
Oct. 27, 1989 [JP] Japan .................. 1-125101[U]
Oct. 30, 1989 [JP] Japan .................. 1-279960
Nov. 1, 1989 [JP] Japan .................. 1-127128[U]
Nov. 9, 1989 [JP] Japan .................. 1-130102[U]
Jun. 12, 1990 [JP] Japan .................. 2-61277[U]

[51] Int. Cl.$^5$ .................. B60G 17/00; B62J 39/00; B62K 11/00
[52] U.S. Cl. .................. 180/219; 280/707; 280/840
[58] Field of Search .................. 180/219; 280/702, 709, 280/714, 707, 840

[56] References Cited

U.S. PATENT DOCUMENTS

| | | | |
|---|---|---|---|
| 4,212,484 | 7/1980 | Fujii | 280/707 |
| 4,422,661 | 12/1983 | Kawamura | 280/707 |
| 4,568,101 | 2/1986 | Bleustein et al. | 280/707 |
| 4,815,758 | 3/1989 | Yoshida | 280/840 |

FOREIGN PATENT DOCUMENTS

| | | | |
|---|---|---|---|
| 3930966 | 3/1990 | Fed. Rep. of Germany | 180/219 |
| 195194 | 8/1989 | Japan | 180/219 |

Primary Examiner—Mitchell J. Hill
Assistant Examiner—Mitchell Banjo
Attorney, Agent, or Firm—Schwartz & Weinrieb

[57] ABSTRACT

A motorcycle having a body height adjustor in which a body height adjusting unit transmits the hydraulic pressure of a pressurized fluid within the rear cushion unit simultaneously to hydraulic jacks of the rear cushion unit and the front suspension units so as to change the length of the front suspensions and the rear cushion unit and to thereby adjust the body height of the motorcycle, is disclosed. The body height adjusting unit is disposed upon the side of the body frame remote from the exhaust pipe. A hose connector for connecting the body height adjusting unit and the hydraulic jacks of the front suspensions is disposed at the rear of the front suspensions and in front of the body height adjusting unit. The hydraulic hoses are disposed along a line corresponding to the center of the front fork of the motorcycle as considered in the widthwise direction of the motorcycle. A blow valve incorporated within the body height adjusting unit is opened by means of the operation of turning OFF the ignition switch so as to forcibly set the motorcycle body to the lower level or height position. The position of a body height changeover valve incorporated within the body height adjusting unit is detected so as to indicate the body height of the motorcycle by means of a body height position indicator, or a transparent window formed within the casing of the hydraulic jack of the rear cushion unit so as to enable the rider to confirm the body height of the motorcycle.

20 Claims, 19 Drawing Sheets

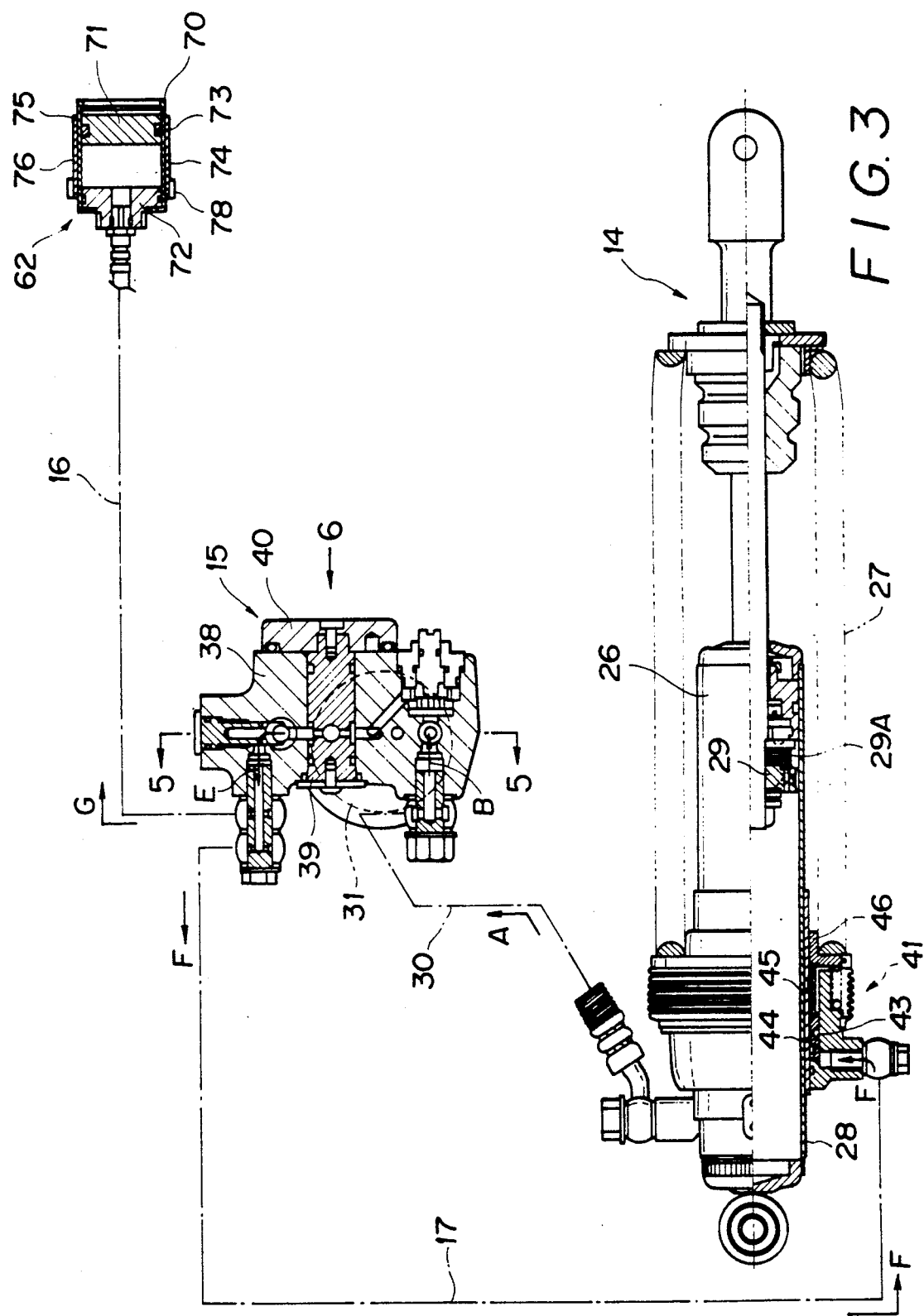

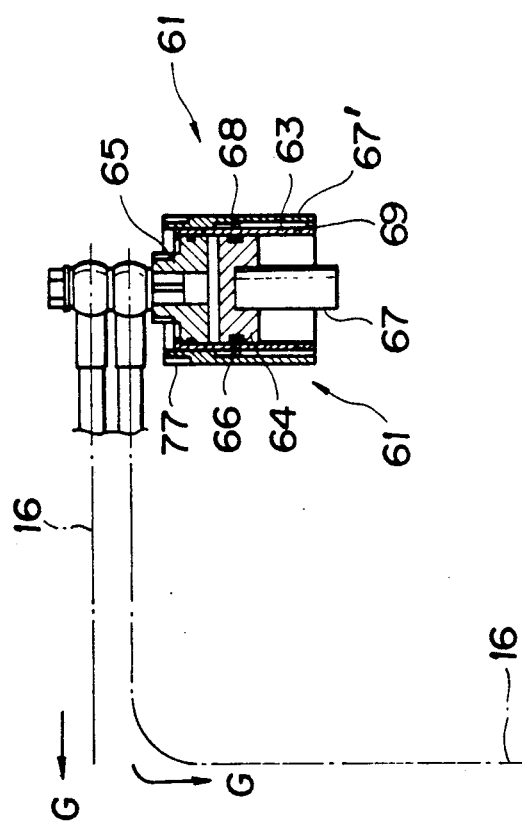
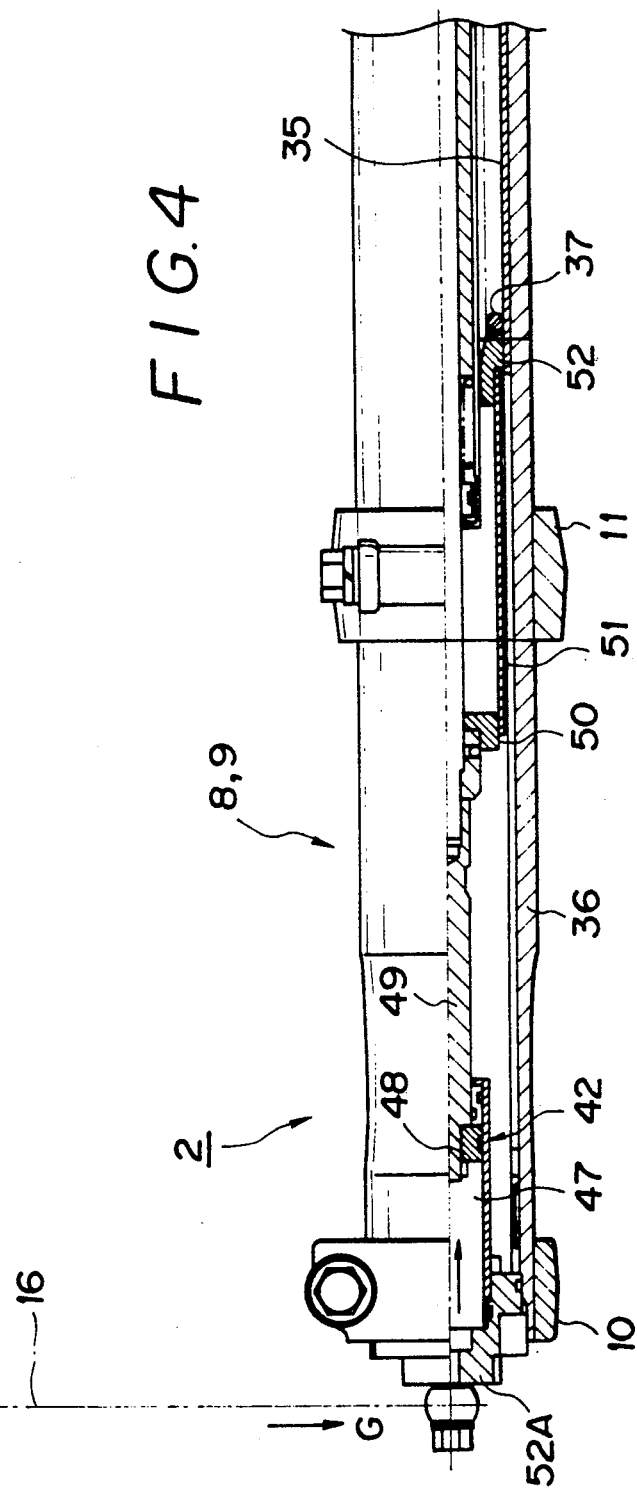
FIG.4

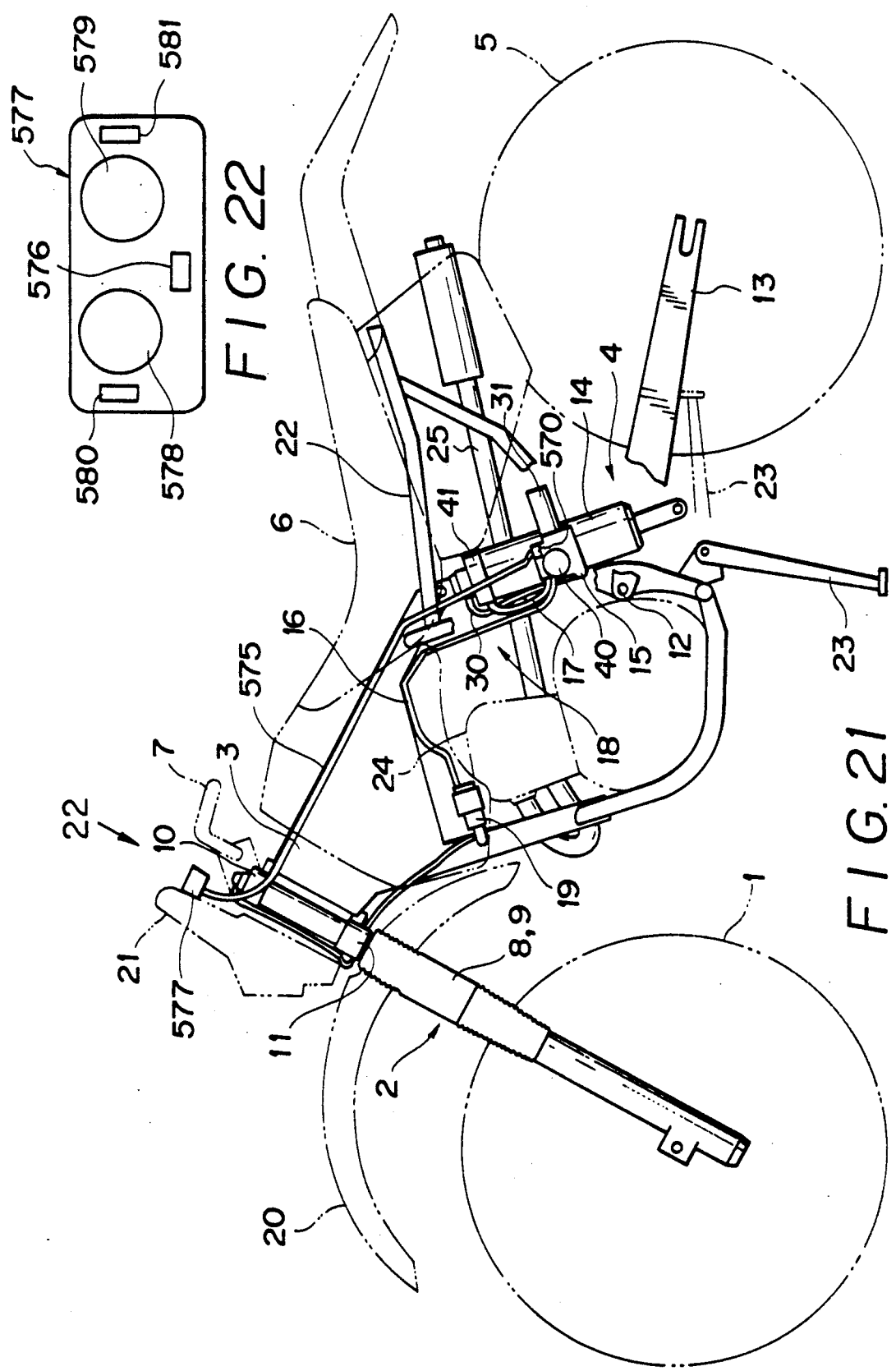

MOTORCYCLE HAVING BODY HEIGHT ADJUSTOR

FIELD OF THE INVENTION

This invention relates to a motorcycle having a body height adjustor for adjusting the body height based upon changes in the lengths of the front suspension and a rear cushion unit.

BACKGROUND OF THE INVENTION

A type of motorcycle has been proposed which has a body height adjustor which is capable of adjusting the body height by using a front suspension and a rear cushion unit. In accordance with this body height adjustor, pressurized oil is supplied to or discharged from each one of the hydraulic jacks of the front suspension and the rear cushion unit so as to change the lengths of the front suspension and the rear cushion unit and, hence, to change the body height of the vehicle.

In accordance with this type of body height adjustor, there is a possibility of the hydraulic oil being supplied to or discharged from only one of the hydraulic jacks of the front suspension and the rear cushion unit and, hence, a possibility of non-uniformity of expansion/contraction of the front suspension and the rear cushion unit. In such an event, there is the risk that the body height balance in the longitudinal direction of the motorcycle will adversely influenced.

Another type of body height adjustor is known in which hydraulic hoses are provided for hydraulic communication between the front suspension and a body height adjusting unit and between the body height adjusting unit and a rear cushion unit. Through these hydraulic hoses, pressurized oil is supplied from the body height adjusting unit to the hydraulic jacks of the front suspension and the rear cushion unit or is discharged from the same so as to change the lengths of the front suspension and the rear cushion unit, thereby adjusting the body height of the cycle. A variation of this body height adjustor which improves the assembly performance of the motorcycle frame is possible in which two hoses detachably connected by means of a hose connector are provided in place of the hydraulic hose connecting the front suspension and the body height adjusting unit. However, if such a hose connector is disposed in front of the front suspension or at the rear of the body height adjusting unit, the hydraulic hose layout is rendered complicated.

Furthermore, because the body height adjusting unit of the above-described body height adjustor is disposed closer to the rear cushion unit, it is necessary to carefully design the layout of the hydraulic hose connecting the body height adjusting unit and the front suspension. That is, it is necessary to avoid obstruction by means of the hydraulic hose to the steering operation of the front fork.

A motorcycle upon which the above-described body height adjustor is provided is constructed so as to be able to stand stably when the side stand is set upright on the condition that the body height is set to a lower height lever. However, when the body height is set to a higher height level, there is a possibility of the rider setting the side stand upright so as to make the motorcycle stand without changing the body height from the higher height lever to the lower height level. The rider may fail to confirm whether the motorcycle body is in the higher position or lower position before setting the side stand upright, while the motorcycle body is maintained at the higher position. There is also a possibility of a phenomenon in which even if the body height adjustor is changed over by the rider so as to select the lower body height when the motorcycle is stopped and made to stand, the body height adjusting operation will be unable to be attained, so that the motorcycle stands still in the higher position. This is because, since the adjustment to the lower height is effected by means of the weight of the body, and since an initial pressure is applied to the reserve tank, the force of the weight applied to the hydraulic jacks is reduced, so that the adjustment operation is not effected, if the motorcycle body is inclined at an earlier time with the side stand extended. In such events described above, the body inclination is increases so that the standing attitude becomes unstable, and there is therefore the risk of the motorcycle falling.

OBJECTS OF THE INVENTION

In view of the above-described circumstances, a first object of the present invention is to provide a motorcycle having a body height adjustor which is capable of easily adjusting the body height of the cycle without losing body height balance in the longitudinal direction of the motorcycle, and which is free from the risk of influence of heat upon the pressurized fluid.

A second object of the present invention is to provide a motorcycle having a body height adjustor in which a hydraulic hose connected by means of a hose connector is simplified so as to reduce the hydraulic hose length.

A third object of the present invention is to provide a motorcycle having a body height adjustor in which the hydraulic hose layout is improved so as to avoid obstruction by means of the hydraulic hose to the steering operation.

A fourth object of the present invention is to provide a motorcycle having a body height adjustor which is capable of improving the stability with which the motorcycle stands.

SUMMARY OF THE INVENTION

To achieve the first object of the present invention, there is provided a motorcycle having a body being adjustable in height, and comprising: a front fork supported axially and rotatably upon a body frame, the front fork supporting a front wheel in a shock absorbing manner by means of a pair of front suspension units; a rear cushion unit supported upon the body frame, the rear cushion unit supporting a rear wheel in a shock absorbing manner; an engine mounted upon the body frame so as to drive and rotate the rear wheel; and a body height adjustor capable of adjusting the body height of the motorcycle by changing the lengths of the front suspension units and the rear cushion unit, the body height adjustor including: a first hydraulic jack provided upon the rear cushion unit so as to enable body height adjustment; second hydraulic jacks provided upon the front suspension units so as to enable body height adjustment; and a body height adjusting unit capable of transmitting hydraulic pressure of a pressurized fluid within the rear cushion unit to the first and second hydraulic jacks through means of hydraulic hoses, the body height adjusting unit having an adjusting operation member for simultaneously transmitting the hydraulic pressure of the pressurized fluid to the first and second hydraulic jacks.

In a more preferred embodiment of the invention, an exhaust pipe extending from the engine is mounted upon the body frame, and the body height adjusting unit is placed in a position opposite to that of the exhaust pipe with respect to the body frame.

According to the present invention, in this aspect, the pressurized fluid can be simultaneously supplied to the hydraulic jacks of the front suspension units and the rear cushion unit by means of the operation of the single adjusting operation member, thereby making it possible to adjust the body height of the motorcycle while maintaining the body height balance in the longitudinal direction of the motorcycle. Since the body height adjusting unit is disposed upon the side of the rear cushion unit remote from the exhaust pipe, there is no risk of the pressurized fluid being deteriorated by means of heat and no risk of the rider suffering a burn when he or she operates the adjusting operation member.

To achieve the second object of the present invention, there is provided a motorcycle which has a body which is adjustable in height, comprising: a front fork supported axially and rotatably upon a body frame, the front fork supporting a front wheel in a shock absorbing manner by means of a pair of front suspensions; a rear cushion unit supported upon the body frame, the rear cushion unit supporting a rear wheel in a shock absorbing manner; an engine mounted upon the body frame so as to drive and rotate the rear wheel; and a body height adjustor capable of adjusting the body height of the motorcycle by changing the lengths of the front suspensions and the rear cushion unit, the body height adjustor including: a first hydraulic jack provided upon the rear cushion unit so as to enable body height adjustment; second hydraulic jacks provided upon the front suspensions so as to enable body height adjustment; a body height adjusting unit capable of transmitting hydraulic pressure of a pressurized fluid within the rear cushion unit to the first and second hydraulic jacks through means of hydraulic hoses; and a hose connector provided upon the hydraulic hoses connecting the body height adjusting unit and the second hydraulic jacks of the front suspensions, the hose connector being disposed at the rear of the front suspensions and in front of the body height adjusting unit.

According to the present invention, in this aspect, the front hydraulic hoses connecting the front suspensions and the body height adjusting unit can be arranged in substantially a straight line because the hose connector is disposed at the rear of the front suspensions and in front of the body height adjusting unit. It is therefore possible to simplify the layout of the hydraulic hoses as well as to reduce the overall hose length.

To achieve the third object of the present invention, there is provided a motorcycle which has a body which is adjustable in height, comprising: a front fork supported axially and rotatably upon a body frame, the front fork supporting a front wheel in a shock absorbing manner by means of a pair of front suspensions; a rear cushion unit supported upon the body frame, the rear cushion unit supporting a rear wheel in a shock absorbing manner; an engine mounted upon the body frame so as to drive and rotate the rear wheel; and a body height adjustor capable of adjusting the body height of the motorcycle by changing the lengths of the front suspensions and the rear cushion unit, the body height adjustor including: a first hydraulic jack provided upon the rear cushion unit so as to enable body height adjustment; second hydraulic jacks provided upon the front suspensions so as to enable body height adjustment; and a body height adjusting unit capable of transmitting hydraulic pressure of a pressurized fluid within the rear cushion unit to the first and second hydraulic jacks through means of hydraulic hoses; wherein the hydraulic hoses connecting the body height adjusting unit and the second hydraulic jacks of the front suspensions are arranged by being disposed downwardly from the upper ends of the front suspensions along a line corresponding to the center of the front fork as considered in the widthwise direction and by being disposed toward the rear end of the motorcycle so as to be connected to the body height adjusting unit.

According to the present invention, in this aspect, the hydraulic hoses connected to the front suspensions extend from the upper ends of the front suspensions and are positioned at the center of the front fork as considered in the widthwise direction thereof. Therefore the state of the hydraulic hoses is not influenced by the steering operation comprising the turning of the front fork to the left or right. That is, there is no risk of the hydraulic hoses obstructing the steering operation of the front fork.

To achieve the fourth object of the present invention, there is provided a motorcycle which has a body which is adjustable in height, comprising: a front fork supported axially and rotatably upon a body frame, the front fork supporting a front wheel in shock absorbing manner by means of a pair of front suspensions; a rear cushion unit supported upon the body frame, the rear cushion unit supporting a rear wheel in a shock absorbing manner; an engine mounted upon the body frame so as to drive and rotate the rear wheel; a body height adjustor capable of adjusting the body height of the motorcycle by changing the lengths of the front suspensions and the rear cushion unit; and an ignition switch capable of starting the engine; the body height adjustor including: a first hydraulic jack provided upon the rear cushion unit so as to enable body height adjustment; second hydraulic jacks provided upon the front suspensions so as to enable body height adjustment; and a body height adjusting unit capable of transmitting hydraulic pressure of a pressurized fluid from the rear cushion unit to the first and second hydraulic jacks through means of hydraulic hoses; the body height adjusting unit having a blow valve capable of being opened by means of an increase in the pressurized fluid within the first and second hydraulic jacks and the hydraulic hoses so as to discharge the pressurized fluid from the first and second hydraulic jacks and the hydraulic hoses, the blow valve also being capable of being opened by means of an operation which turns OFF the ignition switch.

According to the present invention, in this aspect, when the motorcycle is stopped with the ignition switch turned OFF, the blow valve is opened so as to discharge the pressurized fluid within the hydraulic hoses and the hydraulic jacks. At the time of stoppage of the motorcycle, therefore, the initial loads upon the front suspensions and the rear cushion units can be reduced so as to set the body height to a lower height level. As a result, the body inclination at the time of stoppage becomes smaller, thereby improving the stability of the motorcycle.

To achieve the fourth object of the present invention, there is also provided a motorcycle which has a body which is adjustable in height, comprising: a front fork supported axially and rotatably upon a body frame, the front fork supporting a front wheel in a shock absorbing manner by means of a pair of front suspensions; a rear cushion unit supported upon the body frame, the rear cushion unit supporting a rear wheel in a shock absorbing manner; an engine mounted upon the body frame so as to drive and rotate the rear wheel; a body height adjustor capable of adjusting the body height of the motorcycle by changing the lengths of the front suspensions and the rear cushion unit; and a handlebar fixed to the upper end of the front fork; the body height adjustor including: a first hydraulic jack provided upon the rear cushion unit so as to enable body height adjustment; second hydraulic jacks provided upon the front suspensions so as to enable body height adjustment; a body height adjusting unit having a body height changeover valve capable of transmitting hydraulic pressure of a pressurized fluid from the rear cushion unit to the first and second hydraulic jacks through means of hydraulic hoses; a body height position detector disposed within the vicinity of the body height adjusting unit so as to detect operating positions of the body height changeover valve; and a body height position indicator provided within a meter panel in the vicinity of the handlebar so as to indicate the present height of the motorcycle by means of a signal supplied from the body height detector.

According to the present invention, in this aspect, the rider can always confirm the body height of the motorcycle because the body height position indicator indicates the present body height based upon the signal from the body height position detector. Ordinarily, in the case of standing by means of the side stand, there is a risk of the motorcycle falling due to an increase in the body inclination when the motorcycle is disposed in a higher body height position. When the motorcycle is disposed in a lower body height position, the body inclination is small and the risk of the cycle falling is also small. According to this embodiment, the rider can set the motorcycle in the lower body height position by observing the body height position indicator when he stops the motorcycle, thereby preventing falling of the motorcycle at the time of stoppage.

To achieve the fourth object of the present invention, there is also provided a motorcycle which has a body which is adjustable in height, comprising: a front fork supported axially and rotatably upon a body frame, the front fork supporting a front wheel in a shock absorbing manner by means of a pair of front suspensions; a rear cushion unit supported upon the body frame, the rear cushion unit supporting a rear wheel in a shock absorbing manner; an engine mounted upon the body frame so as to drive and rotate the rear wheel; a body height adjustor capable of adjusting the body height of the motorcycle by changing the lengths of the front suspensions and the rear cushion unit; and a side stand attached to the body frame and capable of being set upright and being retracted; and wherein each of the front suspensions and the rear cushion unit are formed as a combination of a coil spring and a hydraulic damper; the body height adjustor including; a first hydraulic jack provided upon the rear cushion unit so as to adjust the body height by moving the upper end of the coil spring of the rear cushion unit upwardly or downwardly; second hydraulic jacks provided upon the front suspensions so as to adjust the body height by moving the upper ends of the coil springs of the front suspensions upwardly or downwardly; and a body height adjusting unit capable of transmitting oil pressure of a pressurized fluid from the rear cushion unit to the first and second hydraulic jacks through means of hydraulic hoses; wherein a window is formed within a side portion of the first hydraulic jack of the rear cushion unit upon the side of the rear cushion unit remote from the side stand so that the upper end of the coil spring can be seen through the see through window.

According to the present invention, in this aspect, the rider can know the condition of the adjustment of the body height of the motorcycle through means of the window and can immediately determine any maladjustment of the adjusting operation or an adjustment error, thereby enabling re-adjustment. In consequence, the possibility of parking the motorcycle in the lower position with the side stand properly positioned is therefore increased. The motorcycle can stand with increased stability and is substantially free from the possibility of falling over. Moreover, since the window is disposed at a position opposite to the side stand, the window faces upward as a result of the inclination of the motorcycle body so as to be easy to observe with the eye.

BRIEF DESCRIPTION OF THE DRAWINGS

Various other objects, features, and attendant advantages of the present invention will become more fully appreciated from the following detailed description, when considered in connection with the accompanying drawings, in which like reference characters designate like or corresponding parts throughout the several views, and wherein:

FIG. 3 is a cross-sectional view of a rear cushion unit, a body height adjusting unit and other members shown in FIG. 1;

FIG. 4 is a cross sectional view of a front suspension and other members shown in FIG. 1;

FIG. 21 is a side view of a motorcycle having a body height adjustor constructed in accordance with a fifth embodiment of the present invention;

FIG. 22 is a view in the direction of the arrow 22 of FIG. 21;

DESCRIPTION OF THE PREFERRED EMBODIMENTS

The first to sixth embodiments of the present invention will now be described below with reference to the accompanying drawings.

Figure 1:
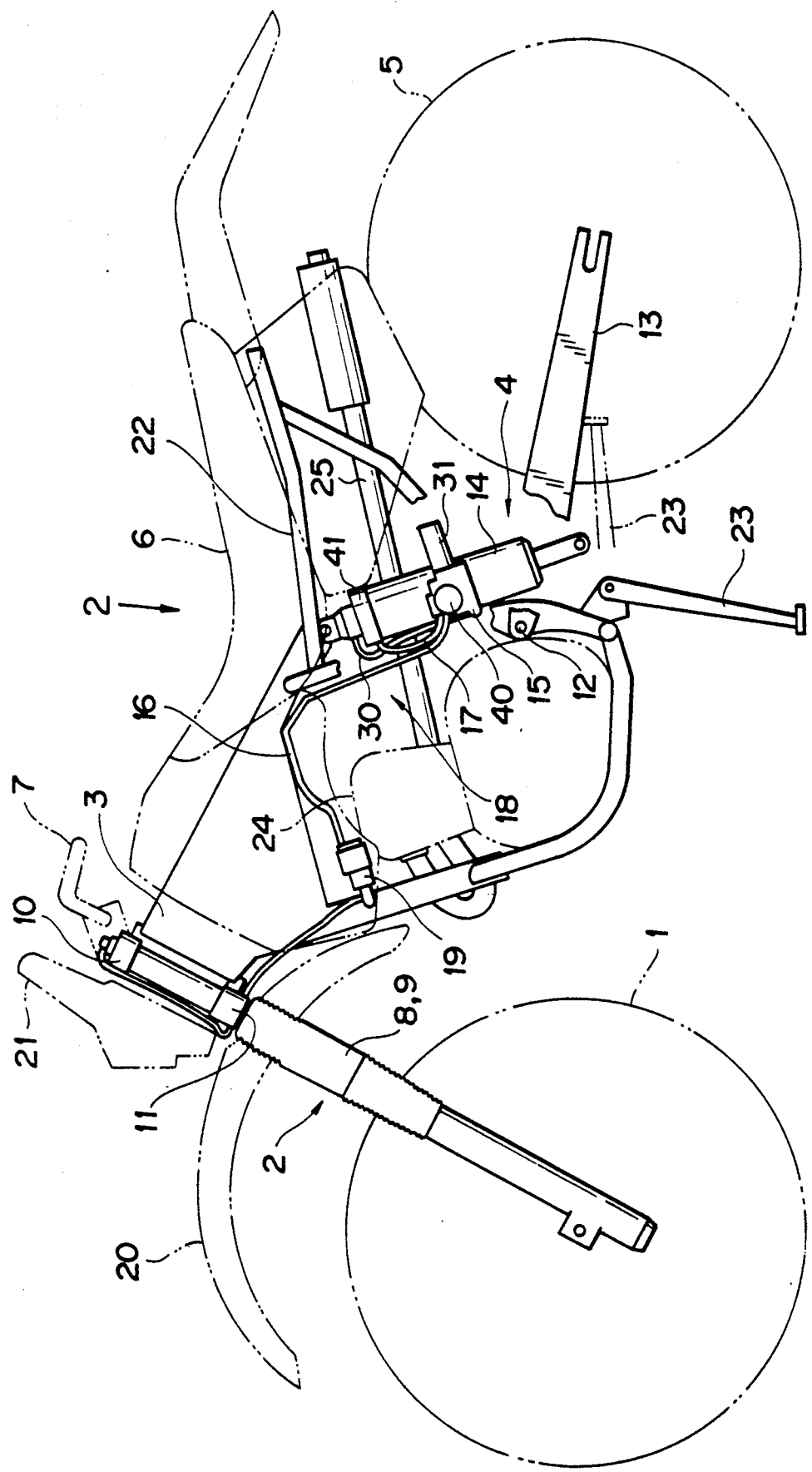
FIG. 1 is a side view of a motorcycle having a body height adjustor constructed in accordance with a first embodiment of the present invention.

FIG. 1 shows a motorcycle having a body height adjustor constructed in accordance with a first embodiment of the present invention. As shown in FIG. 1, a front fork 2 for supporting a front wheel 1 is disposed in front of a body frame 3, and a rear wheel 5 supported by means of a rear suspension 4 is disposed at the rear of the body frame 3. A seat 6 is disposed upon the body frame 3, astride which the rider sits while operating a handlebar 7 and driving the motorcycle.

The front fork 2 is an inverted type front fork formed of a pair of left and right front suspensions 8 and 9. The front suspensions 8 and 9 are supported by means of an upper bracket 10 and a lower bracket 11 upon the body frame 3 through means of an unillustrated steering shaft and a head pipe. The front suspensions 8 and 9 serve to absorb shock from the front wheel 1 and attenuate the vibration thereof.

The rear suspension 4 has a swing arm 13 upon which the rear wheel 5 is axially supported and which is supported by means of a pivot 12 upon the body frame 3, and a rear cushion unit 14 supported at its upper end upon the body frame 3 and at its lower end upon the swing arm 13 through means of a link mechanism (not shown). The rear cushion unit 14 accommodates up-down movement of the swing arm 13 upon the pivot 12 so as to attenuate the vibration of this motion and to thereby reduce shock from the rear wheel 5.

Hydraulic jacks 42 and 41, as will be more fully described later are incorporated within the front suspensions 8 and 9 and the rear cushion unit 14, respectively, and a body height adjusting unit 15 is disposed within the vicinity of the rear cushion unit 14. The hydraulic jacks 42 of the front suspensions 8 and 9 and the body height adjusting unit 15 are connected by means of front hydraulic jack 41 of the rear cushion unit 14 and the body height adjusting unit 15 are connected by means of a rear hydraulic hose 17 upon the rear body side, thereby forming a body height adjustor 18. A hose connector 19 is provided in series with the front hydraulic hoses 16.

In FIG. 1 there is also illustrated a front fender 20, a head lamp housing 21, a seat rail 22 upon the body frame 3, a stand 23, an engine 24, and an exhaust pipe 25 connected to the engine 24.

Referring next to FIG. 3, the rear cushion unit 14 is constituted by means of a rear oil damper 26 and a rear coil spring 27 wound around the rear oil damper 26. The rear oil damper 26 rapidly attenuates the vibration of the coil spring 27 by means of the resistance of the pressurized oil contained within its cylinder 28, wherein such resistance is caused when the pressurized oil flows through small holes defined within a piston 29 and a valve 29A. For control of the amount of pressurized oil within the cylinder 28, the interior of the cylinder 28 communicates with an oil chamber 32 of a reserve tank 31 shown in FIGS. 5 and 6 through means of a connecting hose 30 and a fluid passage formed within the body height adjusting unit 15. The interior of the reserve tank 31 is partitioned by means of a piston 33 into the oil chamber 32 and an air chamber 34.

Referring to FIG. 4, each of the front suspensions 8 and 9 is constituted by means of an inner tube 35 supported upon the front wheel 1 and an outer tube 36 incorporating a front oil damper. The front oil damper rapidly attenuates the vibration of a front coil spring 37 disposed within the inner tube 35.

Figure 2:
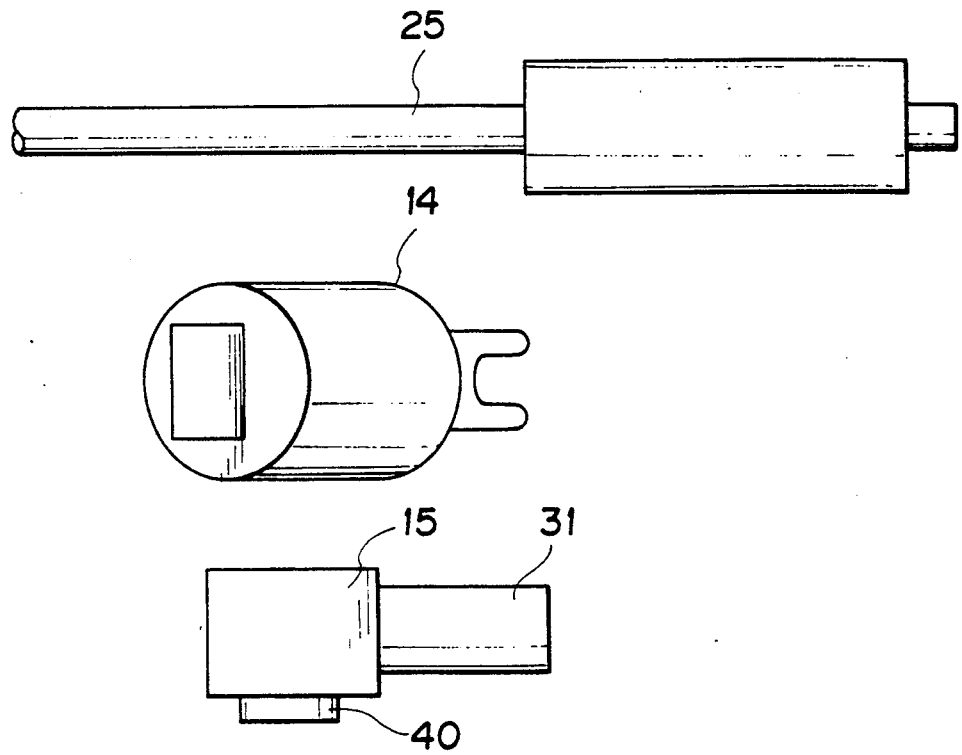
FIG. 2 is a schematic view in the direction of the arrow 2 of FIG. 1.
Figure 6:
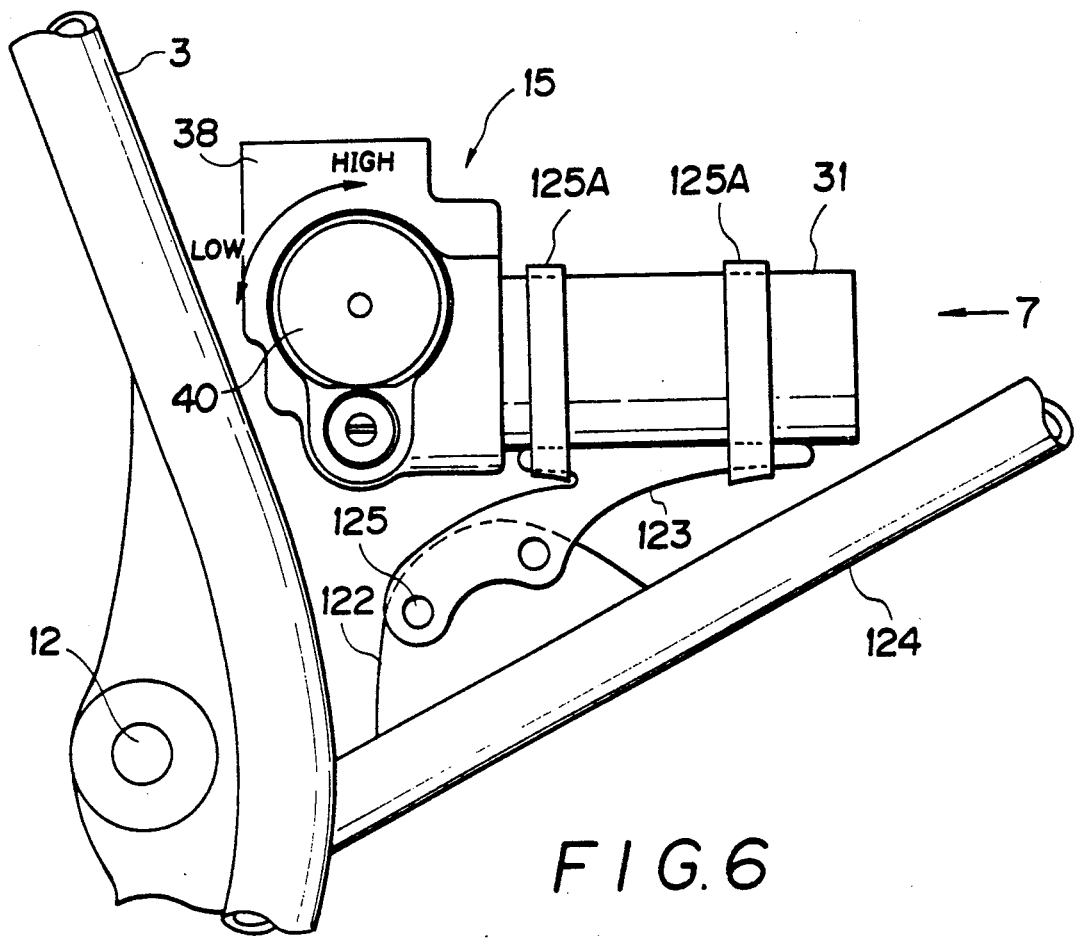
FIG. 6 is a view in the direction of the arrow 6 of FIG. 3, showing the attachment of the body height adjusting unit.
Figure 7:
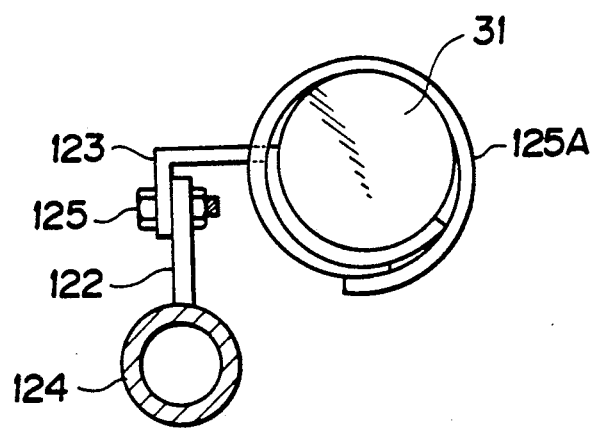
FIG. 7 is a view in the direction of the arrow 7 of FIG. 6.

Referring to FIGS. 1 and 2, the body height adjusting unit 15 is disposed within the vicinity of the rear cushion unit 14 under the seat rail 22 and above the pivot 12. As shown in FIG. 2, the rear cushion unit 14 is disposed at the center of the body frame 3 as considered in the widthwise direction, and the body height adjusting unit 15 is disposed upon the side of the rear cushion unit 14 remote from the exhaust pipe 25. An adjusting operation member 40 to be described later is attached to the body height adjusting unit 15 upon the outer side of the motorcycle. The body height adjusting unit 15 is attached to a seat pillar 124 by means of a fixing bracket 122 and an attachment bracket 123, as shown in FIGS. 6 and 7. That is, the fixing bracket 122 is fixed to the seat pillar 124, the attachment bracket 123 is fixed to the fixing bracket 122 by means of bolts 125, and the reserve tank 31 integrally combined with the body height adjusting unit 15 is secured to the attachment bracket 123 by means of metallic bands 125A and other members.

Figure 5:
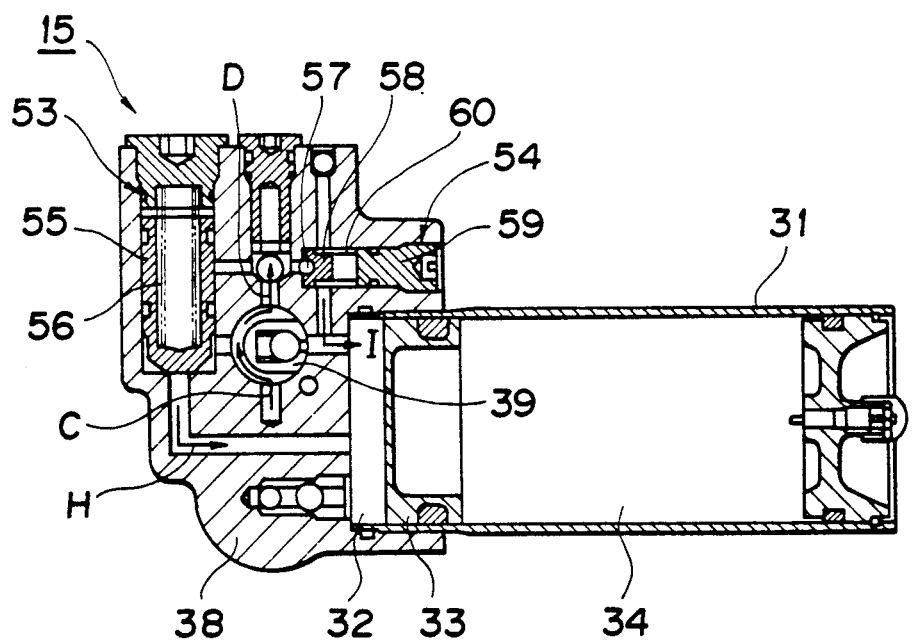
FIG. 5 is a cross-sectional view taken along the line 5—5 in FIG. 3.

The body height adjusting unit 15 has, as shown in FIGS. 3 and 5, a spool valve 39 which is rotatably disposed at the center of an adjusting unit body 38, and to which the adjusting operation member 40 also shown in FIG. 6 is integrally connected. The spool valve 39 is changed over by means of the rotation of the adjusting operation member 40 to a high position so as to increase the body height or to a low position so as to reduce the body height. As a result of the changeover of the spool valve 39, the hydraulic pressures of the pressurized oil to be transmitted to the hydraulic jacks 42 of the front suspensions 8 and 9 and the hydraulic jack 41 of the rear cushion unit 14 are transmitted simultaneously.

That is, when the spool valve 39 is changed over to the high position by means of the operation of the adjusting operation member 40, the piston 29 within the oil damper 26 shown in FIG. 3 is moved upwardly and downwardly as a result of the swinging of the swing arm 13, so that the pressurized oil contained within the cylinder 28 flows as indicated by means of the arrows A and B, the arrows C and D of FIG. 5 and the arrow E of FIG. 3, and into the hydraulic jack 41 of the rear cushion unit 14 through means of the rear hydraulic hose 17, as indicated by means of the arrow F of FIG. 3. The pressurized oil flowing as indicated by means of the arrow E within the body height adjusting unit 15 also flows into a joint 62 of the hose connector 19 shown in FIG. 8 upon the body height adjusting unit side through means of the front hydraulic hose 16, as indicated by means of the arrow G shown in FIG. 3. The hydraulic pressure of this pressurized oil is transmitted to the hydraulic jacks 42 of the front suspensions 8 and 9 shown in FIG. 4 by means of a joint 61 upon the front fork side shown in FIG. 4.

The hydraulic jack 41 has, as shown in FIG. 3, a jack piston 44 disposed inside a jack cylinder chamber 43. The extent of movement of the jack piston 44 is transmitted to a spring guide 46 through means of a spacer 45 so as to change the initial load upon the spring 27. Accordingly, as the pressurized oil flows into the jack cylinder chamber 43 of the hydraulic jack 41 from the body height adjusting unit 15, the jack piston 44 is moved so as to bias the spring guide 46 downwardly, and the rear cushion unit 14 is thereby extended so as to increase the body height of the cycle to the high body height position.

Each of the hydraulic jacks 42 of the front suspensions 8 and 9 has, as shown in FIG. 4, a jack piston 48 disposed inside a jack cylinder chamber 47 formed within the outer tube 36. The extent of movement of the jack piston 48 is transmitted to a spring guide 52 through means of a plunger 49, a ring 50 and a spacer 51. The two front hydraulic hoses 16 are connected to fork caps 52A of the left and right front suspensions 8 and 9 so as to introduce the pressurized oil contained within the front hydraulic hoses 16 into the jack cylinder chambers 47. When the hydraulic pressure of the pressurized oil is transmitted to each hydraulic jack 42 through means of the hose connector 19, the jack piston 48 is moved downwardly and the spring guide 52 thereby depresses the spring 37 so as to increase the initial load upon the spring 37, so that the front suspensions 8 and 9 are extended so as to increase the body height of the cycle to the high body height position.

In order to reduce the body height of the vehicle, the adjusting operation member 40 is rotated so as to change over the spool valve 39 to the low position. Then the pressurized oil within the hydraulic jack 41 of the rear cushion unit 14 (refer to FIG. 3) is returned to the oil chamber 32 of the reserve tank 31 by means of the rear hydraulic hose 17 and the fluid passage within the body height adjusting unit 15 under the influence of the weight of the motorcycle body. Also, the pressurized oil within each of the hydraulic jacks 42 of the front suspensions 8 and 9 (refer to FIG. 4) is returned to the joint 61 of the hose connector 19 upon the front fork side under the influence of the weight of the motorcycle body. The pressurized oil within the joint 62 upon the body height adjusting unit side is thereby returned to the oil chamber 32 of the reserve tank 31 through means of the body height adjusting unit 15. The initial loads upon the coil spring 27 of the rear cushion unit 14 and the coil springs 37 of the front suspensions 8 and 9 are thereby reduced, so that the rear cushion unit 14 and the front suspensions 8 and 9 are contracted, thereby reducing the body height of the cycle to the low body height position.

In the adjusting unit body 38, a first blow valve 53 and a second blow valve 54 are provided as shown in FIG. 5. The first blow valve 53 has a piston 55 and a spring 56 for biasing the piston 55. In the first blow valve 53, the piston 55 moves upwardly against the biasing force of the spring 56 so as to discharge a part of the pressurized oil into the oil chamber 32 of the reserve tank 31, as indicated by means of the arrow H of FIG. 5, if the pressure of the pressurized oil flowing into the body height adjusting unit 15 from the rear oil damper 26 by means of the communication hose 30 (refer to FIG. 3) becomes equal to or higher than a predetermined pressure at the time of changeover of the spool valve 39 to the high position.

In the second blow valve 54, a ball 57 is loosely disposed within a push piece 58, and a spring 60 is provided between the push piece 58 and a spring guide 59 which is threadedly secured within the adjusting unit body 38. If the motorcycle jumps during a moving operation when the spool valve 39 is disposed in the high changeover position and if the hydraulic pressure of the pressurized oil within the hydraulic jack 41 of the rear cushion unit 14 and that of the pressurized oil within the hydraulic jacks 42 of the front suspensions 8 and 9 are thereby increased, the ball 57 moves against the biasing force of the spring 60 so that the pressurized oil within the front hydraulic hoses 16 and the rear hydraulic hose 17 is returned to the oil chamber 32 of the reserve tank 31, as indicated by means of the arrow I, thereby preventing the hydraulic hoses 16 and 17 from being damaged.

Figure 8:
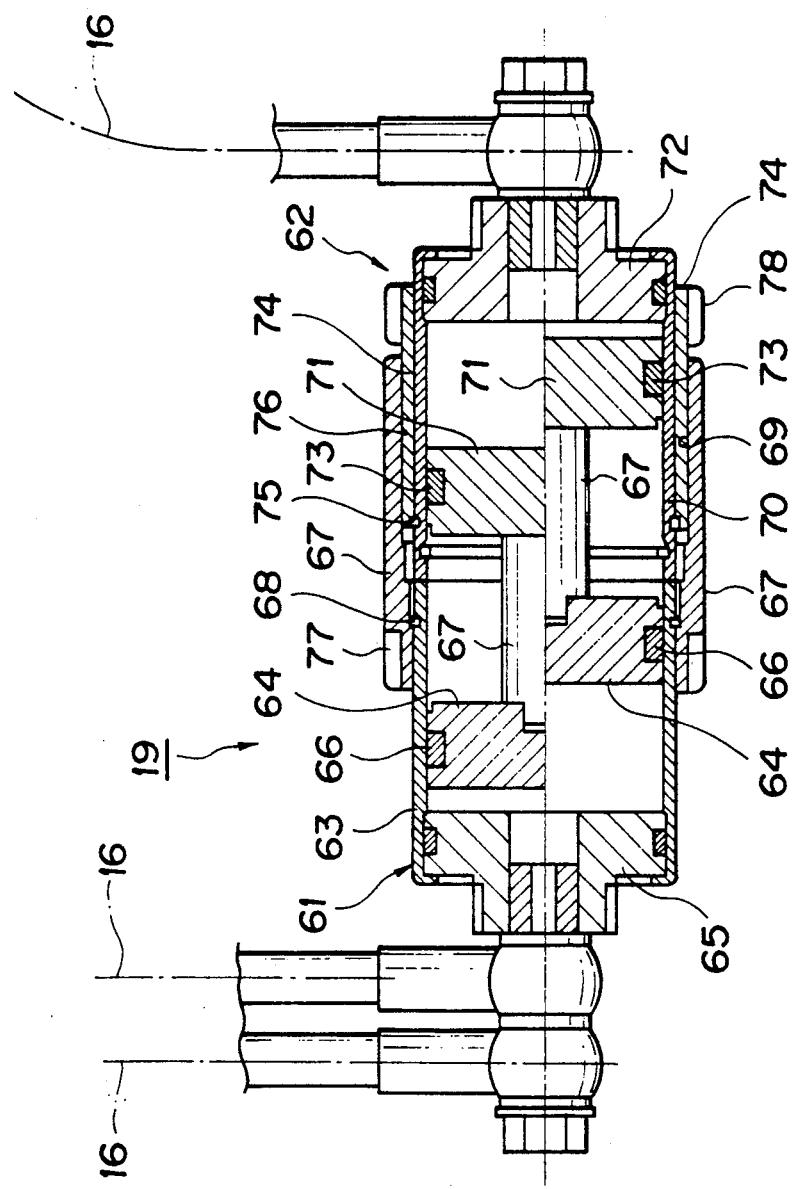
FIG. 8 is a cross-sectional view of a hose connector.

The hose connector 19 provided for the hydraulic hoses 16 is constituted by means of the joint 61 upon the front fork side and the joint 62 upon the body height adjusting unit side, as shown in FIGS. 4, 3 and 8.

In the joint 61 upon the front fork side, a free piston 64 is slidably disposed within a cylinder 63, and a hose connecting member 65 is fixed to one end of the cylinder 63. The cylinder 63 is filled with the pressurized oil. The two front hydraulic hoses 16 are connected at their respective one ends to the hose connecting member 65 and at the other ends to the hydraulic jacks 42 of the front suspensions 8 and 9. An oil seal 66 is attached to an outer peripheral portion of the free piston 64 so as to prevent the pressurized oil from leaking. A push rod 67 projects outwardly from the free piston 64.

Furthermore, an outer cylinder 67' is loosely disposed about the outer peripheral surface of the cylinder 63. The position of the outer cylinder 67' is restricted in the longitudinal direction of the cylinder 63 by means of a ring 68 fixed upon the cylinder 63. A female thread 69 is formed upon an inner circumferential surface portion of a top end portion of the outer cylinder 67'.

The joint 62 upon the body height adjusting unit side is formed in the same manner as the joint 61 upon the front fork side. A free piston 71 is disposed within a cylinder 70, and the hose connecting member 72 is fixed to an end of the cylinder 70. The front hydraulic hose 16 is connected at its one end to the hose connecting member 72 and at the other end to the body height adjusting unit 15. An oil seal 73 is also attached to the free piston 71. An outer cylinder 74 is loosely disposed about the outer peripheral surface of the cylinder 70. The position of the outer cylinder 74 is restricted by means of a ring 75 fixed upon the cylinder 70, and a male thread 76 is formed upon an outer circumferential surface of the outer cylinder 74.

Spanners (not shown) are fitted upon nut portions 77 and 78 of the respective outer cylinders 67' and 74 are operated so as to mesh the female thread 69 of the joint 61 o the front fork side with the male thread 76 of the joint 62 upon the body height adjusting unit side, thereby connecting the joint 61 upon the front fork side and the joint 62 upon the adjusting unit side, as seen in FIG. 8. In this connected state, the push rod 67 of the joint 61 upon the front fork side abuts against the free piston 71 of the joint 62 upon the adjusting unit side, and the free pistons 64 and 71 are linked by means of the push rod 67. Upper and lower half sections of FIG. 8 indicate the leftward and rightward movements of the free pistons 64 and 71, respectively.

According to the first embodiment described above, the adjusting operation member 40 of the body height adjusting unit 15 is rotated so as to change over the spool valve 39 to the high position when the motorcycle travels upon rough ground or the like. The pressurized oil within the rear cushion unit 14 is thereby supplied in a pressurized state to the hydraulic jack 41 of the rear cushion unit 14 and to the hydraulic jacks 42 of the front suspension units 8 and 9 by mean of the body height adjusting unit so as to increase the lengths of the rear cushion unit 14 and the front suspension units 8 and 9 thereby increasing the body height of the motorcycle and, hence, the road clearance. For traveling upon an urban road or the like, the spool valve 39 of the body height adjusting unit 15 is changed over to the low position so as to discharge the pressurized oil within the hydraulic jacks 41 and 42 and thereby reduce the lengths of the rear cushion unit 14 and the front suspension units 8 and 9. The body height of the motorcycle is thereby reduced so that the rider's feet can easily reach the ground.

As described above, the pressurized oil can be simultaneously supplied to the hydraulic jacks 42 and 41 of the front suspensions 8 and 9 and the rear cushion unit 14 by means of the operation of rotating the single adjusting operation member 40, thereby making it possible to adjust the body height of the motorcycle while maintaining the body height balance in the longitudinal direction of the motorcycle.

Since the body height adjusting unit 15 is disposed upon the side of the rear cushion unit 14 remote from the exhaust pipe 25, as seen in FIG. 2, there is no risk of the pressurized oil being deteriorated by means of the heat from the exhaust system and no risk of the rider suffering a burn when he or she operates the adjusting operation member 40.

Since the body height adjusting unit 15 is disposed within the vicinity of the rear cushion unit 14, the connection hose 30 can be shortened. It is therefore possible to improve the response of hydraulic pressure transmission from the cylinder 28 of the rear cushion unit 14 to the hydraulic jacks 42 and 41 of the front suspensions 8 and 9 and the rear cushion unit 14 through means of the body height adjusting unit 15.

The adjusting operation member 40 of the body height adjusting unit 15 is attached to the adjusting unit body 38 upon the outer side of the motorcycle body. Therefore it can be easily operated by means of the rider, and the body height adjustor can be manufactured at a lower cost in comparison with a remote control type adjustor and can be free from operational errors.

Figure 9:
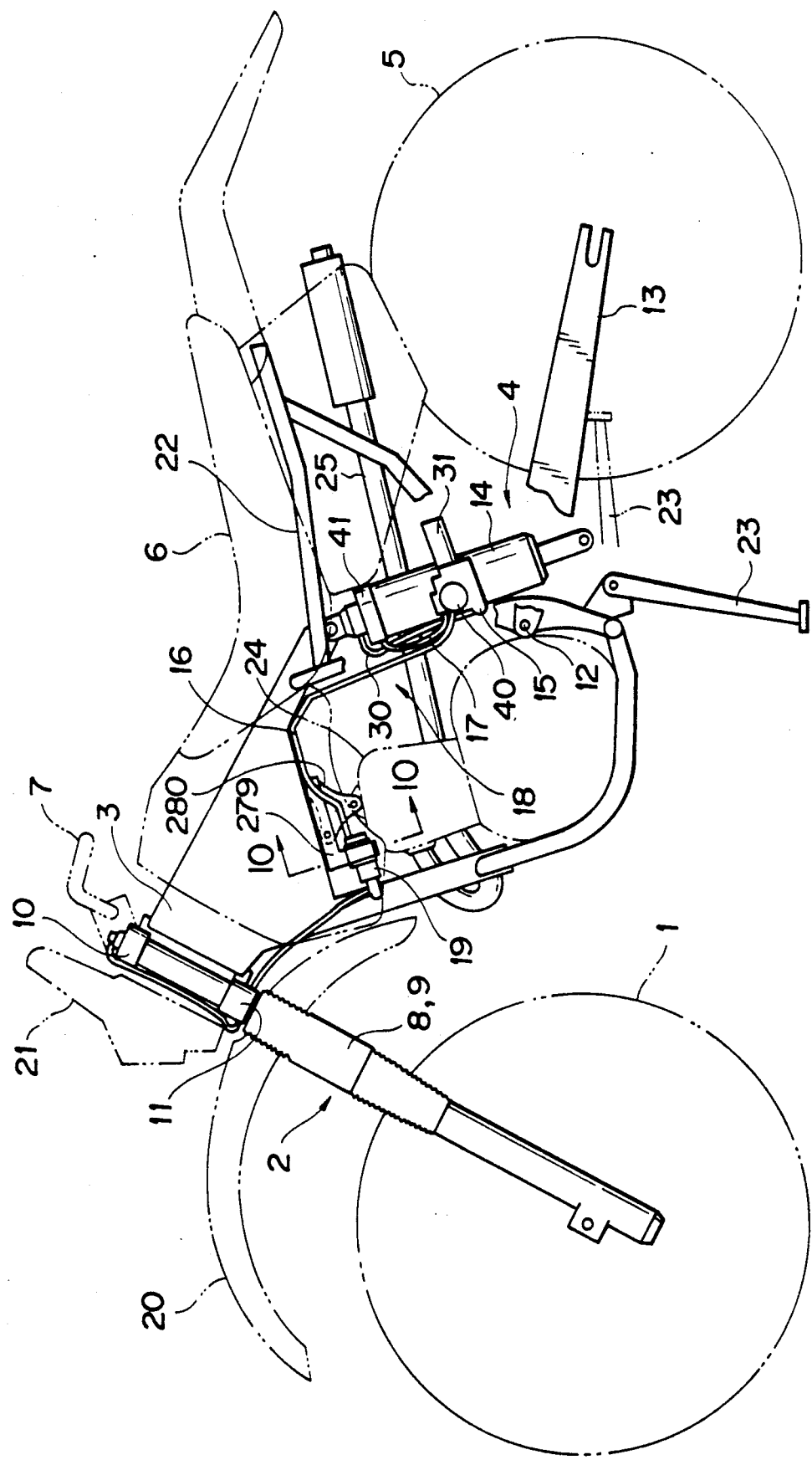
FIG. 9 is a side view of a motorcycle having a body height adjustor constructed in accordance with a second embodiment of the present invention.

FIG. 9 is a side view of a motorcycle having a body height constructed in accordance with a second embodiment of the present invention. Components of this embodiment identical or corresponding to those of the first embodiment are indicated by means of the same reference symbols, and the description for them will not be repeated.

Figure 10:
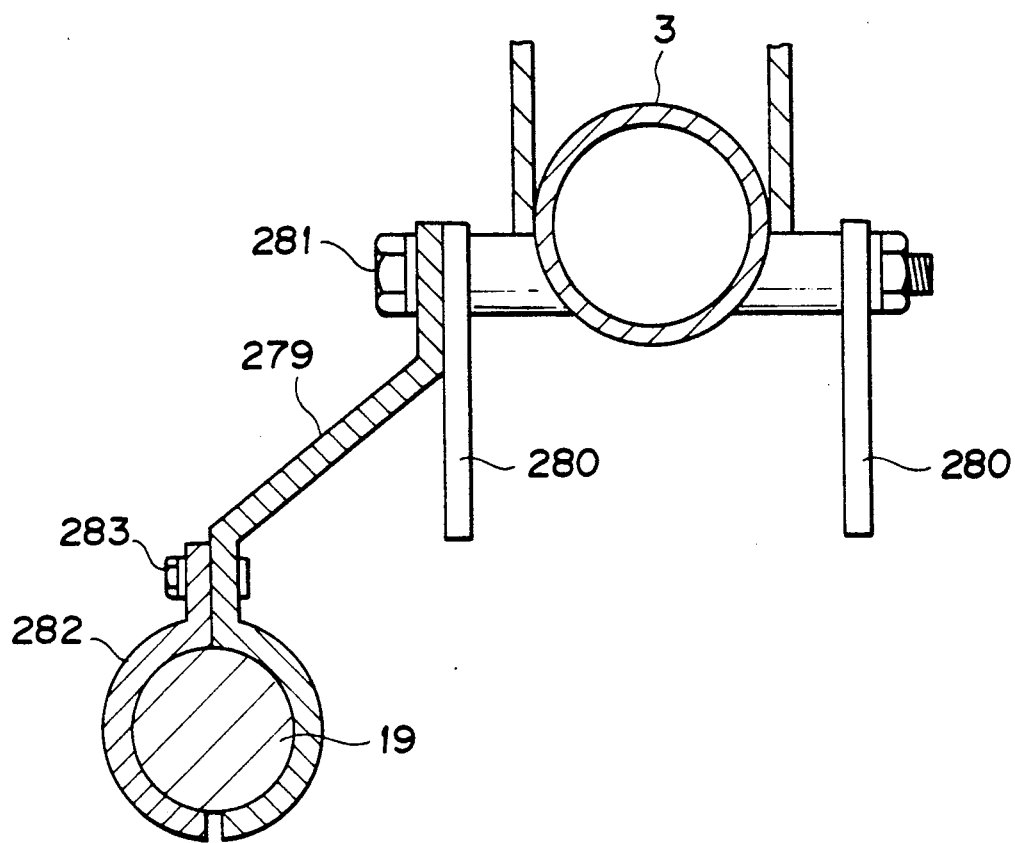
FIG. 10 is a cross-sectional view taken along the line 10—10 of FIG. 9.

As shown in FIG. 9, the hose connector 19 of the second embodiment is disposed at the rear of the front suspensions 8 and 9 and in front of the body height adjusting unit 15. The hose connector 19 is attached to the body frame 3 by means of an attachment bracket 279, as shown in FIGS. 9 and 10. The attachment bracket 279 is secured together with an engine suspension plate 280 to the body frame 3 by means of bolt fasteners 281. An auxiliary bracket 282 is fixed upon the attachment bracket 279 by means of bolts 283. The hose connector 19 is pinched between the attachment bracket 279 and the auxiliary bracket 282.

Consequently, the second embodiment has the following effects along with those of the first embodiment. Because the hose connector 19 is disposed at the rear of the front suspensions 8 and 9 and in front of the body height adjusting unit 15, the front hydraulic hoses 16 connecting the front suspensions 8 and 9 and the body height adjusting unit 15 upon the front side of the motorcycle can be disposed along the body frame 3 in a substantially straight line. It is therefore possible to simplify the layout of the hydraulic hoses 16 as well as to reduce the overall hose length. As a result, the degree of freedom of the layout of the front hydraulic hoses 16 is thereby increased, the body height adjustor can be reduced in cost, and it is possible to limit the reduction in efficiency normally caused by means of an expansion of the hydraulic hoses 16 and the like.

Figure 11:
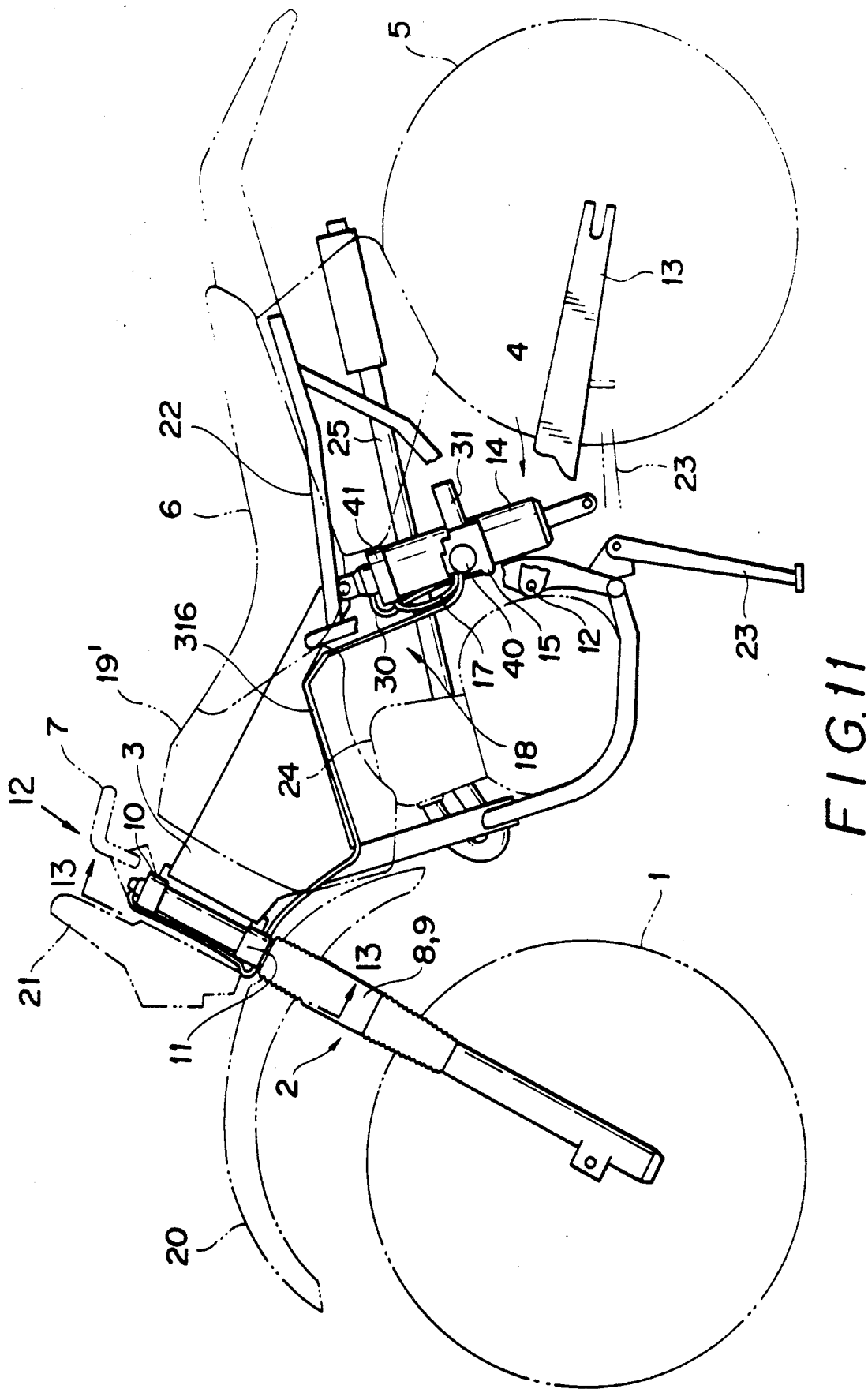
FIG. 11 is a side view of a motorcycle having a body height adjustor constructed in accordance with a third embodiment of the present invention.

FIG. 11 is a side view of a motorcycle having a body height adjustor constructed in accordance with a third embodiment of the present invention. Components of this embodiment identical or corresponding to those of the first embodiment are indicated by means of the same reference symbols, and the description for them will not be repeated.

Figure 14:
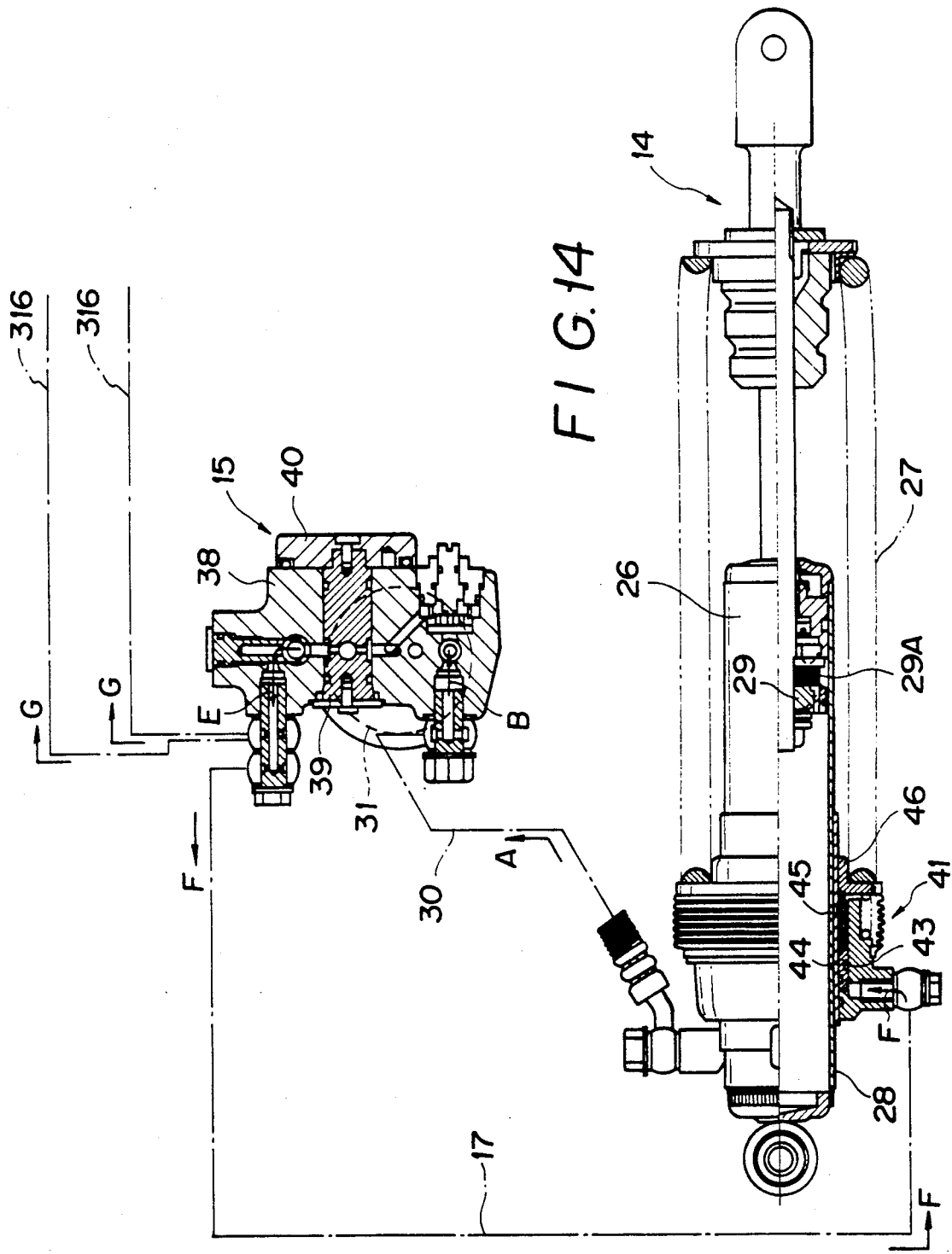
FIG. 14 is a cross sectional view of a rear cushion unit, a body height adjusting unit and other members shown in FIG. 11.
Figure 15:
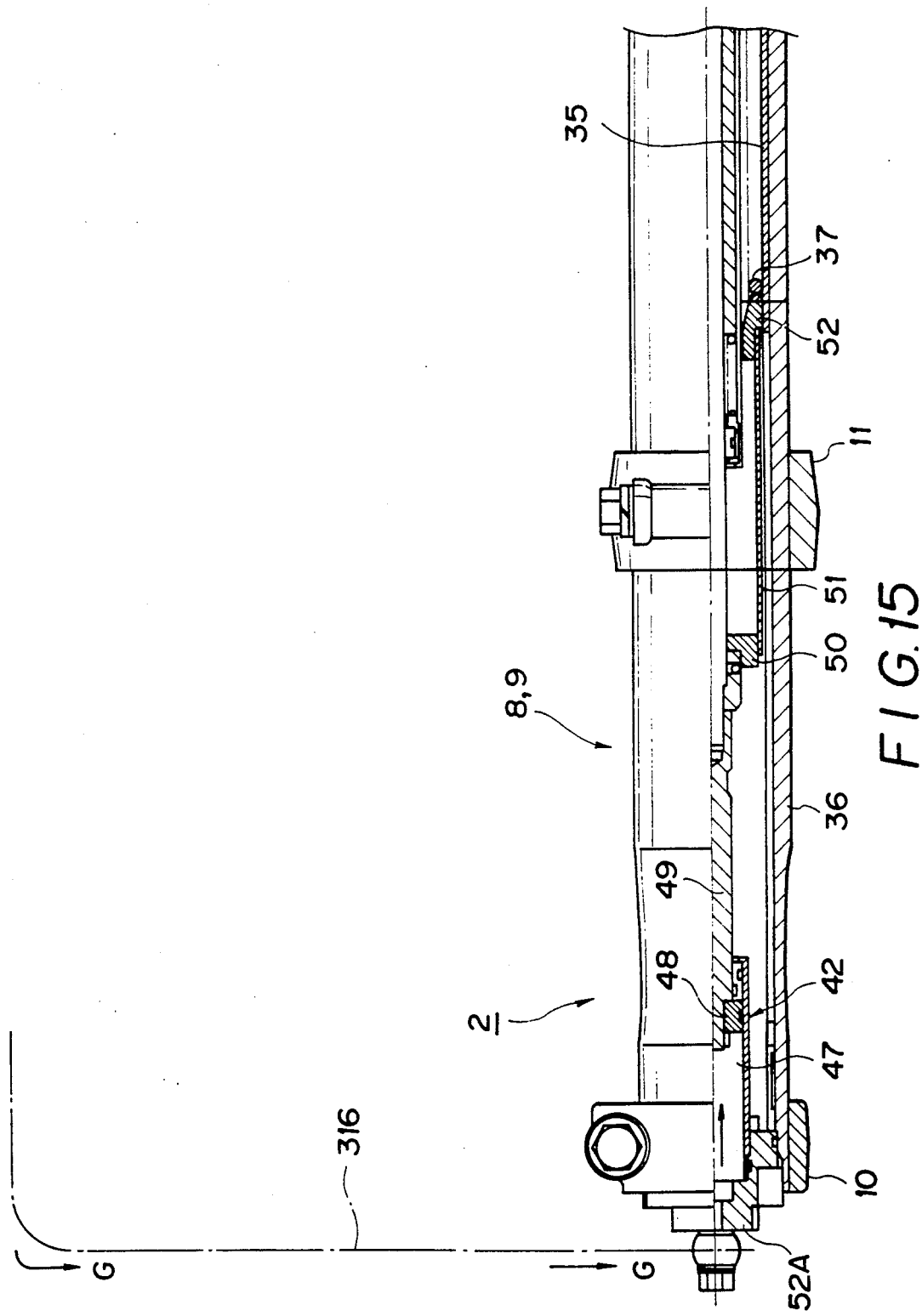
FIG. 15 is a cross-sectional view of a front suspension shown in FIG. 11.

In the third embodiment, the hose connector 19 of the first embodiment is not provided within the front hydraulic hoses 316, and consequently the body height adjusting unit 15 is directly connected to the hydraulic jacks 42 of the front suspensions 8 and 9 by means of the front hydraulic hoses 316. Accordingly, when the body height of the motorcycle is increased, the pressurized oil flows from the motorcycle adjusting unit 15 into the hydraulic jacks 42, or when the body height of the motorcycle is reduced, the pressurized oil within the hydraulic jacks 42 flows into the oil chamber 32 of the reserve tank 31 by means of the body height adjusting unit 15, as shown in FIGS. 14 and 15.

Figure 12:
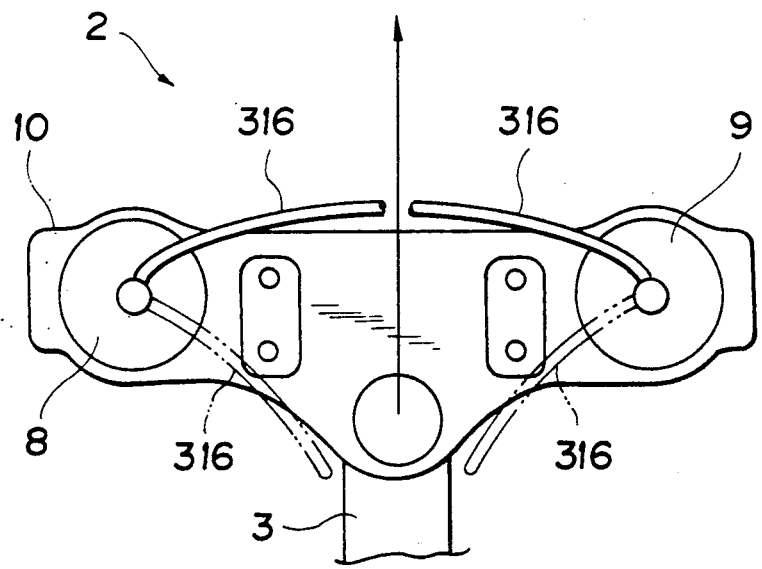
FIG. 12 is a view in the direction of the arrow 12 of FIG. 11.
Figure 13:
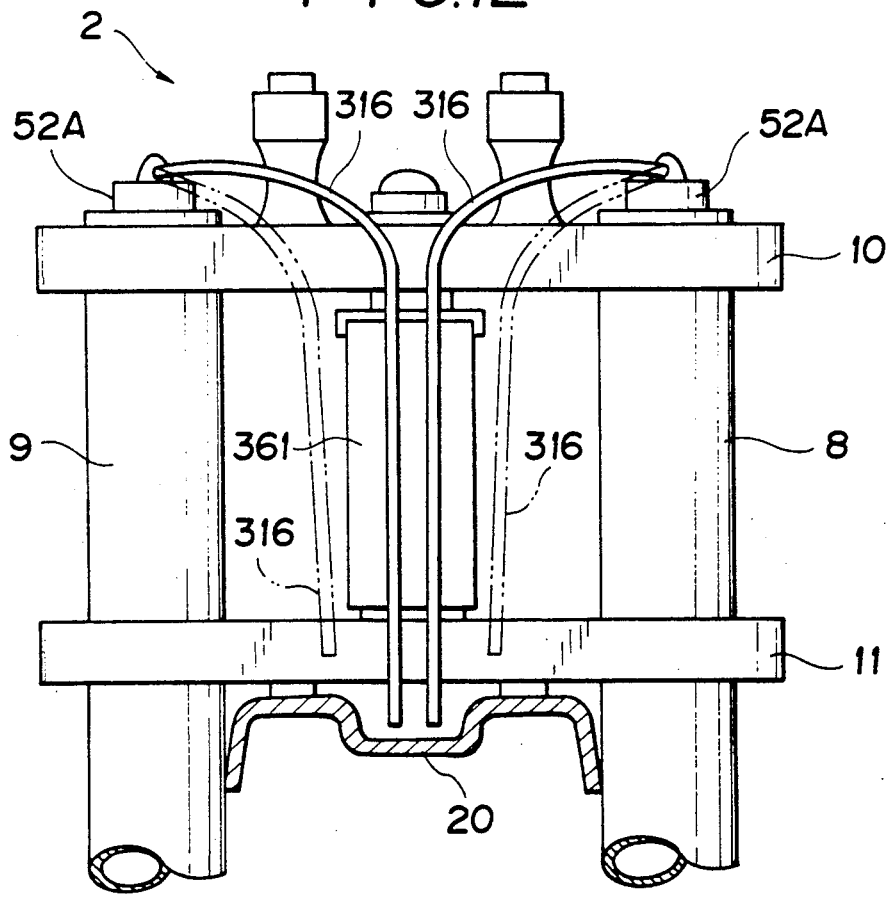
FIG. 13 is a cross-sectional view taken along the line 13—13 of FIG. 11.

The layout of the front hydraulic hoses 316 in accordance with the third embodiment will be described below. A pair of front hydraulic hoses 316 are respectively connected to fork caps 52A attached to upper ends of the front suspensions 8 and 9. As shown in FIGS. 12 and 13, the hydraulic hoses 316 are led downwardly upon the motorcycle front side of the upper and lower brackets 10 and 11 along a line connecting the centers of these brackets 10 and 11 as considered in the widthwise direction of the motorcycle, are led between the lower bracket 11 and the front fender 20 and then between the lower side of a fuel tank 19' and an upper portion of the engine 24 as shown in FIG. 11 as considered, and are connected to the body height adjusting unit 15.

Consequently, the third embodiment has the following effects along with those of the first embodiment. Because the front hydraulic hoses 316 extending from the fork caps 52A are positioned at the centers of the upper and lower brackets 10 and 11 in the widthwise direction of the motorcycle, that is, corresponding to the center of the front fork 2 as considered in the widthwise direction of the cycle, the state of the hydraulic hoses 316 is not influenced by means of the steering operation of the front fork 2 to the left or right. That is, there is no risk of the hydraulic hoses 316 obstructing the steering operation.

Moreover, the front hydraulic hoses 316 are positioned in front of the upper and lower brackets 10 and 11, and the head lamp housing 21 is disposed in front of the hydraulic hoses 316. The head lamp housing 21 therefore serves to protect the front hydraulic hoses 316 and to reduce the risk of damage to the hydraulic hoses 316. Also, since the hydraulic hoses 316 are led between the lower bracket 11 and the front fender 20, the hydraulic hoses 316 are protected by means of the front fender 20 from stones or the like which may be scattered or thrown downwardly by means of the front wheel 1, whereby the risk of damage to the hydraulic hoses 316 is further reduced.

This embodiment has been described with respect to the arrangement in which the front hydraulic hoses 316 connected to the fork caps 52A are positioned in front of the upper and lower brackets 10 and 11. Alternatively, the front hydraulic hoses 316 may be led downwardly along a path disposed behind the upper and lower brackets 10 and 11 and upon bilateral sides of a head pipe 61 and may then be led apart from each other to the left and to the right or bundled together toward the rear of the motorcycle, as indicated by means of the double-dot-dash lines in FIGS. 12 and 13. In this case, there is also no risk of the two hydraulic hoses 316 obstructing the steering operation of the front fork 2 because they are extending along the center line of the front fork 2.

Figure 16:
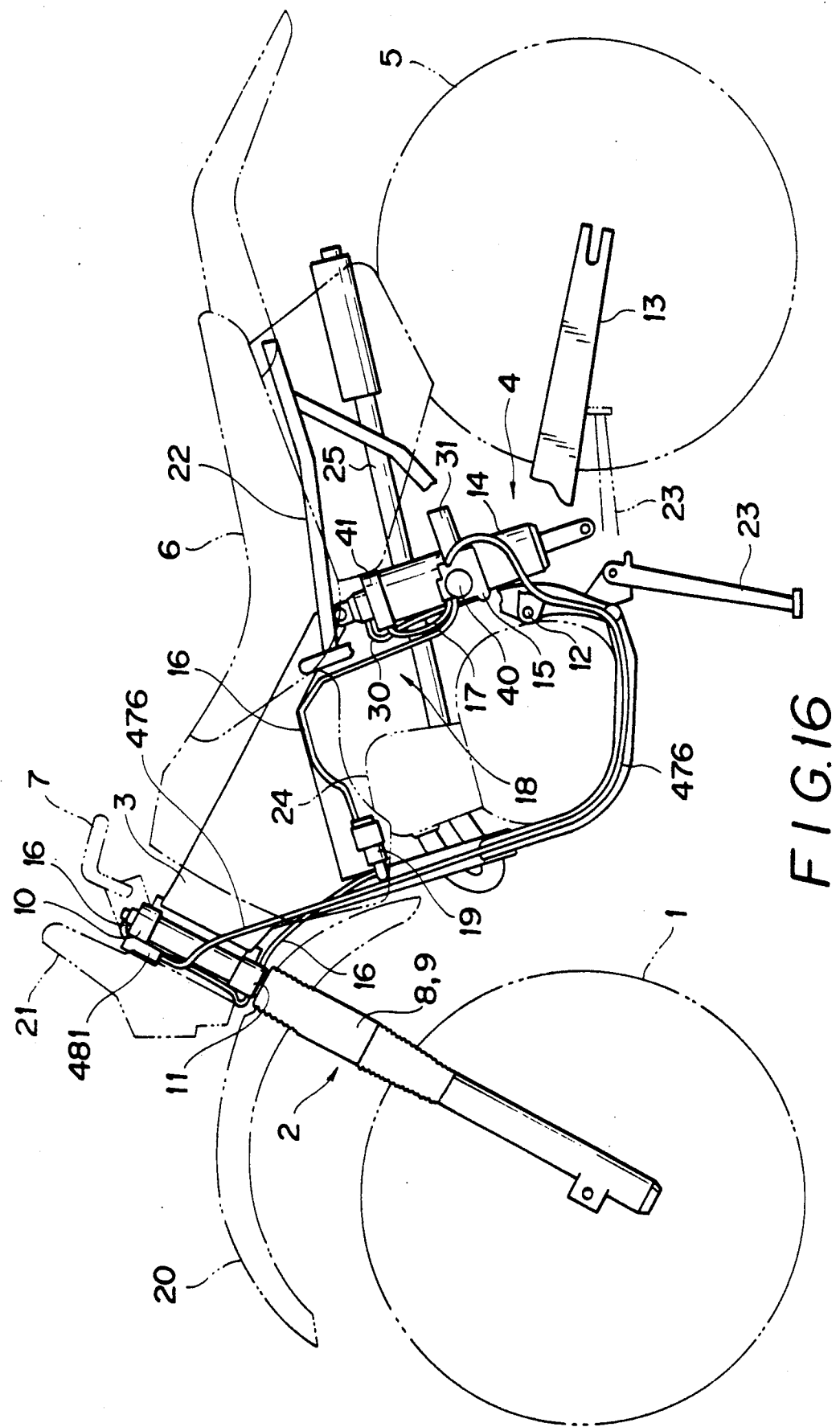
FIG. 16 is a side view of a motorcycle having a body height adjustor constructed in accordance with a fourth embodiment of the present invention.
Figure 17:
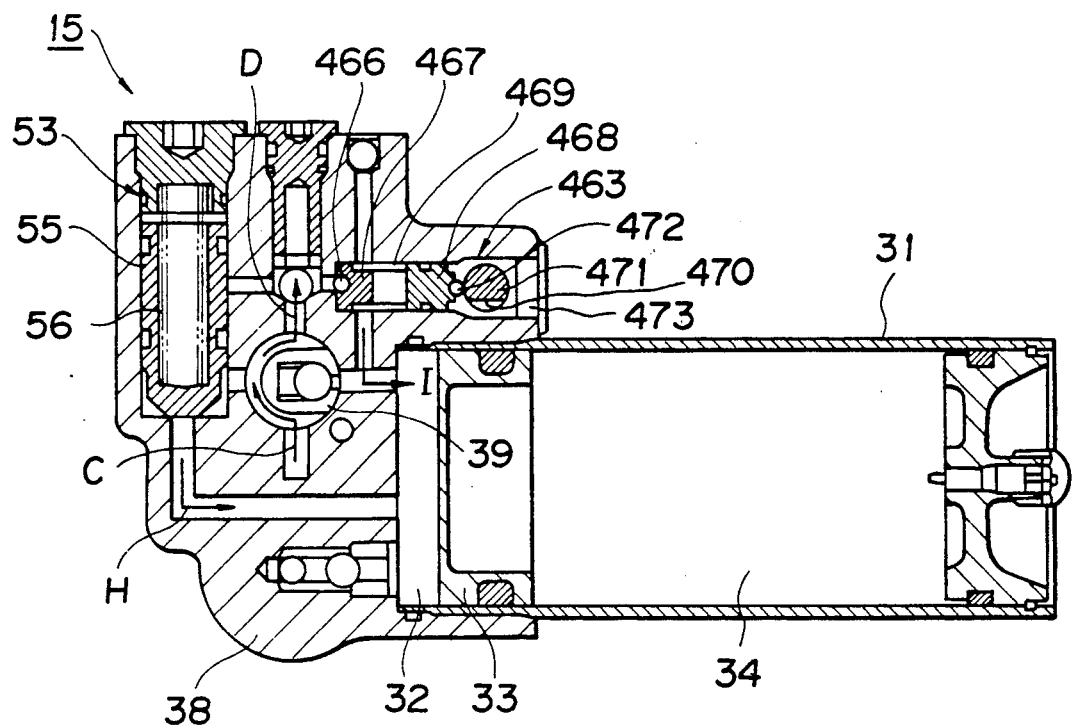
FIG. 17 is a cross-sectional view of a body height adjusting unit of the body height adjustor shown in FIG. 16.

FIG. 16 is a side view of a motorcycle having a body height adjustor constructed in accordance with a fourth embodiment of the present invention, and FIG. 17 is a cross-sectional view of the body height adjustor shown in FIG. 16. Components of this embodiment identical or corresponding to those of the first embodiment are indicated by means of the same reference symbols, and the description for them will not be repeated.

In the fourth embodiment, as shown in FIG. 17, the body height adjusting unit 15 has a second blow valve 463 in which a ball 466 is loosely disposed within a push piece 467 and in which a spring 469 is disposed between the push piece 467 and a spring guide 468. Furthermore, a body height correction shaft 471 upon which a cam 470 is formed is rotatably disposed at the rear of the spring guide 468. A roller 472 is loosely disposed upon the back surface of the spring guide 468 so as to engage an outer peripheral surface portion of the body height correction shaft 471 and the cam 470. Reference symbol 473 designates a cap.

Figure 19:
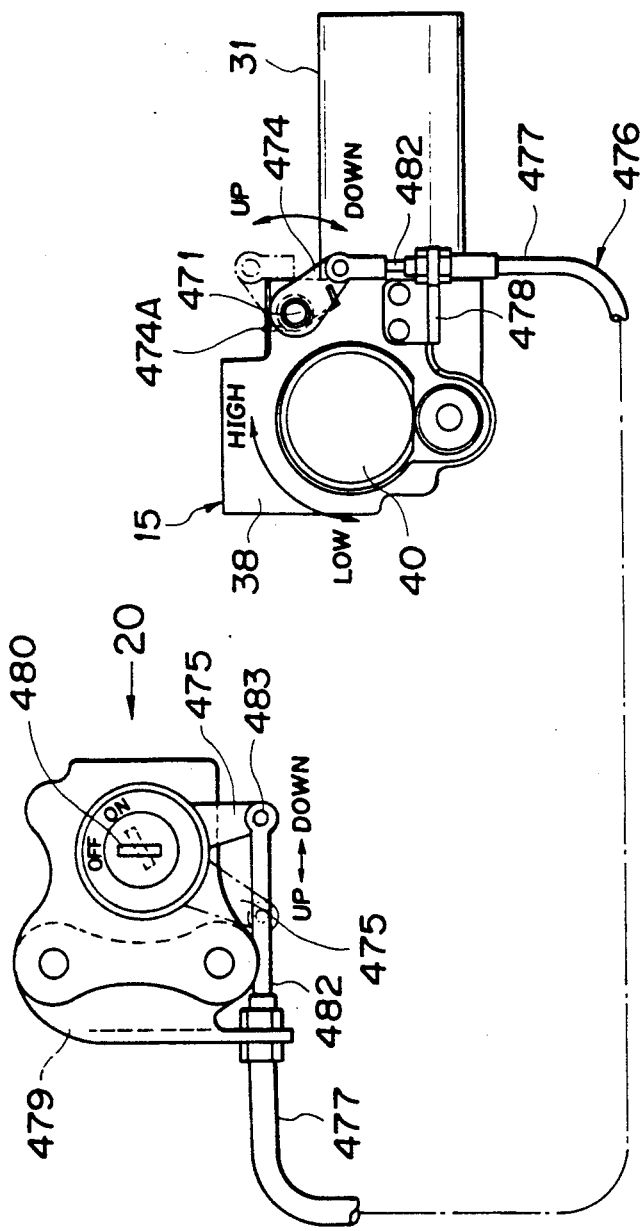
FIG. 19 is a schematic diagram of the body height adjusting unit and the ignition switch of FIG. 16.
Figure 20:
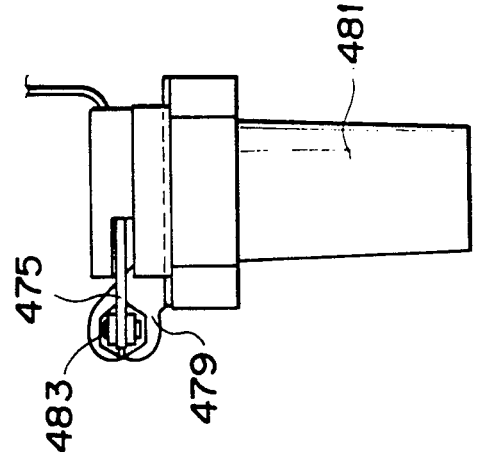
FIG. 20 is a view in the direction of the arrow 20 of FIG. 19.

The second blow valve 463 has a first function of returning the pressurized oil within the front hydraulic hoses 16 and the rear hydraulic hose 17 to the oil chamber 32 of the reserve tank 31 as indicated by means of the arrow I so as to prevent the hydraulic hoses 16 and 17 from being damaged when the motorcycle jumps during moving operations and where spool valve 39 is disposed at the high changeover position. The second blow valve 463 also has a second function of correcting the body height of the motorcycle by forcibly reducing the body height when the motorcycle is stopped. That is, as shown in FIG. 19, a correction lever 474 is integrally fixed to the body height correction shaft 471. The correction lever 474 and an ignition switch lever 475 are connected by means of a link cable 476. The correction lever 474 is biased by means of a return spring 474A to an UP position. An outer cable 477 of the link cable 476 is fixed at its one end to the body height adjusting unit body 38 by means of a cable bracket 478 and at the other end to a cable bracket 479. The cable bracket 479 is attached to an ignition case 481 in which an ignition switch 480 for starting the engine 24 is housed, as is shown in FIG. 20. Accordingly, the link cable 476 is led toward the front end of the body frame 3 by means of a lower portion of the same, as shown in FIG. 16.

An inner cable 482 of the link cable 476 is attached at its one end to the correction lever 474 and at the other end to the ignition switch lever 475, as shown in FIG. 19. The ignition switch lever 475 is integrally rotatable with the ignition switch 480 and is pivotably attached to the inner cable 482 by means of a pin 483. The ignition switch lever 475 is disposed at an UP position (indicated by means of the dot-dash line in FIG. 19) when the ignition switch 480 is turned ON, and it is disposed at a DOWN position (indicated by means of the solid line in FIG. 19) when the ignition switch 480 is turned OFF.

Accordingly, when the ignition switch 480 is in the ON state for operating the engine 24, the ignition switch lever 475 is in the UP position and the correction lever 474 is also maintained in the UP position by means of the inner cable 482. At this time, as shown in FIG. 17, the outer peripheral surface of the body height correction shaft 471 contacts the roller 472 and the fluid passage of the second blow valve 463 is closed by means of the ball 466.

Figure 18:
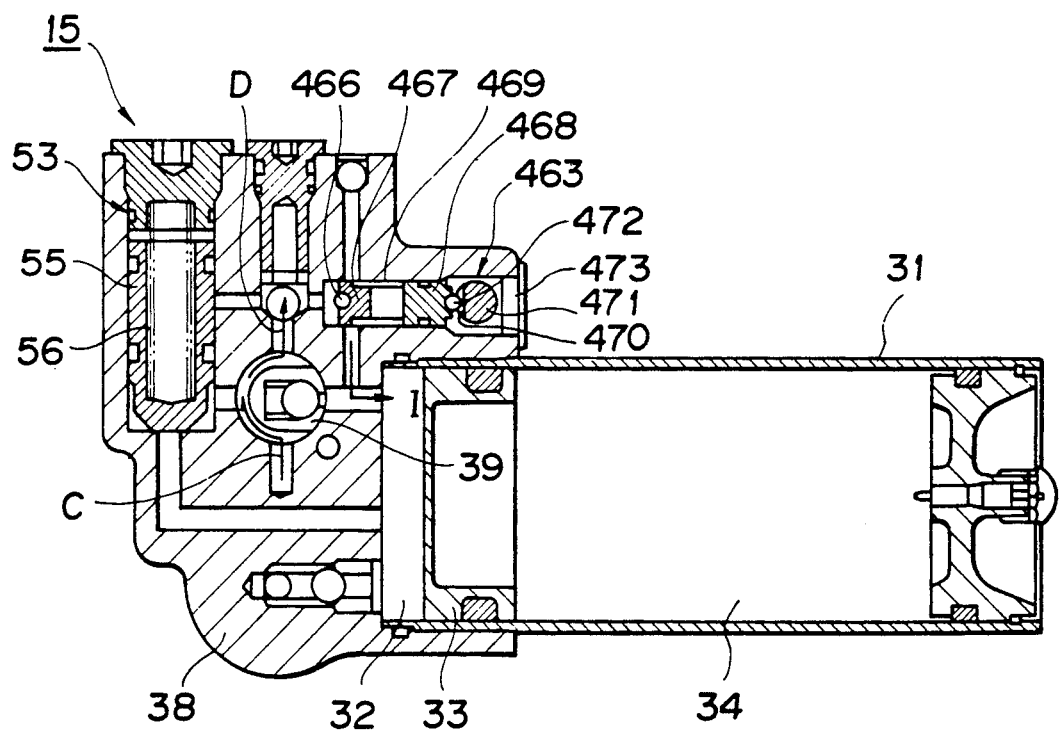
FIG. 18 is a cross-sectional view of a blow valve, in its OPEN state, by means of an ignition switch.

When the ignition switch 480 is turned OFF (as indicated by means of the solid line in FIG. 19), the ignition switch lever 475 is disposed in the DOWN position (indicated by means of the solid line in FIG. 19) and the correction lever 474 is also disposed in the DOWN position (indicated by means of the solid line in FIG. 19) by means of the inner cable 482 of the link cable 476. At this time, as shown in FIG. 18, the body height correction shaft 471 is rotated so that the cam 470 engages the roller 472. As a result, the spring guide 468, the spring 469, the push piece 467 and the ball 466 are moved toward the body height correction shaft 471 so as to open the second blow valve 463 and thereby discharge the pressurized oil from the hydraulic hoses 16 and 17 into the oil chamber 32 of the reserve tank 31, as indicated by means of the arrow I. The hydraulic pressure of the pressurized oil within each of the hydraulic jacks 42 and 41 of the front suspensions 8 and 9 and the rear cushion unit 14 is thereby reduced so that the initial loads upon the front suspensions 8 and 9 and the rear cushion unit 14 are reduced, thereby reducing the body height of the motorcycle to the same height as that set by changing over the spool valve 39 to the low body height position.

Consequently, the fourth embodiment has the following effects along with those of the first embodiment. That is, the second blow valve 463 is constructed so as to be opened, as a result of being linked to the operation of the ignition switch 480, when the ignition switch 480 is turned OFF, through means of the body height correction shaft 471, the correction lever 474 and the link cable 476 and thereby discharge the pressurized oil from the hydraulic hoses 16 and 17 into the oil chamber 32 of the reserve tank 31. Accordingly, in a case where the motorcycle is stopped while the spool valve 39 is disposed at the high changeover position as a result of being set by means of the adjusting operation member 40, and where the ignition switch 480 is thereafter turned OFF, the hydraulic pressure within the hydraulic jack 41 of the rear cushion unit 14 and the hydraulic jacks 42 of the front suspensions 8 and 9 are reduced and the rear cushion unit 14 and the front suspensions 8 and 9 are contracted so as to reduce the body height of the motorcycle. As a result, even if the motorcycle is made to stand with the side stand 23 in a state where the spool valve 39 is disposed at the high position, the body inclination of the motorcycle is restricted, thereby improving the motorcycle standing stability.

In a case where the ignition switch 480 is turned OFF while the spool valve 39 is disposed at the low changeover position as a result of being set by means of the adjusting operation member 40, the correction lever of the second blow valve 463 is rotated. In this case, however, the hydraulic pressures within the hydraulic jack 41 of the rear cushion unit 14 and the hydraulic jacks 42 of the front suspensions 8 and 9 are so low that the pressurized oil within the hydraulic hoses 16 and 17 does not flow into the oil chamber 32 of the reserve tank 31. The lower body height set by means of the changeover of the spool valve 39 to the low position is therefore maintained. In this case also, the body inclination of the motorcycle is maintained restricted and the motorcycle standing stability is high.

As has been noted, since the second blow valve 463 is opened by being linked to the operation of the ignition switch 480, the body height of the motorcycle can be reduced when the motorcycle is stopped and when the ignition switch 480 is turned OFF after travelling in a state where the spool valve 39 has been changed over to and maintained in the high position. When the ignition switch 480 is turned ON and when the motorcycle is again started, the body height of the cycle is increased. Thus, the body height of the motorcycle can be automatically changed from the lower height to the higher height or from the higher height to the lower height by means of the ON/OFF operation of the ignition switch 480.

FIG. 21 is a side view of a motorcycle having a body height adjustor constructed in accordance with a fifth embodiment of the present invention. Components of this embodiment identical or corresponding to those of the first embodiment are indicated by means of the same reference symbols, and the description for them will not be repeated.

Figure 23A:
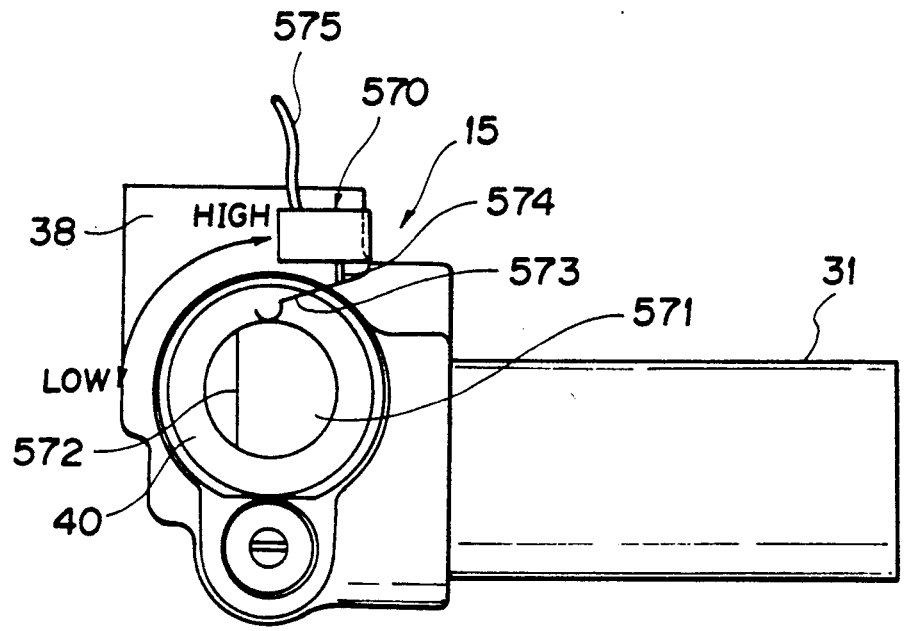
FIG. 23A is a side view of a body height adjusting unit shown in FIG. 23A, showing the operation of the body height position detector.
Figure 23B:
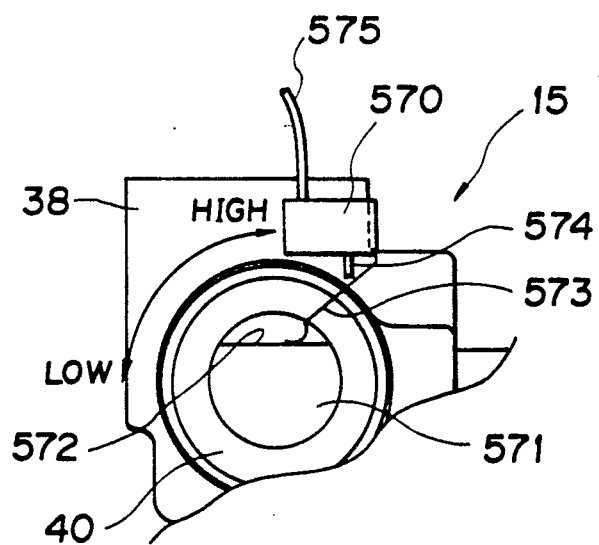
FIG. 23B is a side view of a part of the body height adjusting unit provided with a body height position detector.

In this fifth embodiment, a body height position detector 570 such as, for example, that shown in FIGS. 23A and 23B is attached to the adjusting unit body 38. A projecting portion 571 is integrally formed upon the adjusting operation member 40 at the center of the same so as to extend outwardly from the motorcycle body. A cam 572 is formed on the projecting portion 571 upon one side thereof. The cam 572 is rotated as a result of being linked to the operation of rotating the adjustment operation member 40, that is, to the operation of changing over the spool valve 39. FIG. 23A shows the state in which the spool valve 39 is in the low changeover position, while FIG. 23B shows the state in which the spool valve 39 is in the high changeover position.

A switching piece 573 of the body height detector 570 comprises a flexible member having an end portion capable of constantly contacting the outer peripheral surface of the projection portion 571 and the cam 572. A switch 574 of the body height detector 570 is brought into contact with the switching piece 573 so as to be turned ON when the spool valve 39 is changed over to the low body height position (FIG. 23A). When the spool valve 39 is changed over to the high body height position (FIG. 23B), the end portion of the switching piece 573 is brought into contact with the cam 572, and piece 573 is thereby no longer in contact with the switching piece 573 and is turned OFF. A signal representing the ON/OFF state of this switch 574 is transmitted through suitable wiring 575 to a body height position indicator 576 mounted within a meter panel 577 as shown in FIGS. 21 and 22.

The meter panel 577 is disposed upon the head lamp housing 21 which is disposed within the vicinity of the handlebar 7. Within the meter panel 577 there is provided, along with the body height position indicator 576, a speedometer 578, a tachometer 579, a fuel gauge 580, and a water temperature gauge 581. The lamp of the body height position indicator 576 is turned ON by means of the ON signal from the body height detector 570 or is turned OFF by means of the OFF signal from the same. That is, the body height position indicator 576 is illuminated when the motorcycle body is in the lower position.

Consequently, the fifth embodiment has the following effects along with those of the first embodiment. The body height position detector 570 effects ON/OFF operation by means of the changeover operation of the spool valve 39, the lamp of the body height position indicator 576 is turned ON/OFF by means of this ON/OFF operation, and the body height position indicator 576 is provided within the meter panel 577 from which the body height indication of the motorcycle can be easily read by means of the rider. The rider can therefore recognize that the motorcycle body height is in the lower position if the body height position indicator 576 is illuminated. Accordingly, when it is desired to park the motorcycle by using the side stand 23, the illuminated state of the body height position indicator 756 can be previously confirmed before the side stand 23 is used. The body inclination can therefore be small when the side stand 23 is used, thus preventing falling of the motorcycle during standing.

In the above described embodiment, the higher position or the lower position of the body height of the motorcycle is confirmed by means of the on/off state of the lamp of the body height position indicator 576. However, the following arrangement may alternatively be adopted. That is, two body height position detectors 570 may be provided upon on the adjusting unit body 38 of the body height adjusting unit 15, and the body height position indicator 576 comprises two juxtaposed lamps for respectively indicating the high and low height positions of the motorcycle. One of the body height position detectors 570 illuminates the low position lamp of the body height position indicator 576 when the spool valve 39 is changed over to the low height position, and the other body height position detector 570 illuminates the high position lamp of the body height position indicator 576 when the spool valve 39 is changed over to the high height position. This arrangement ensures that the motorcycle body position can be confirmed more definitely by means of the rider.

Figure 24:
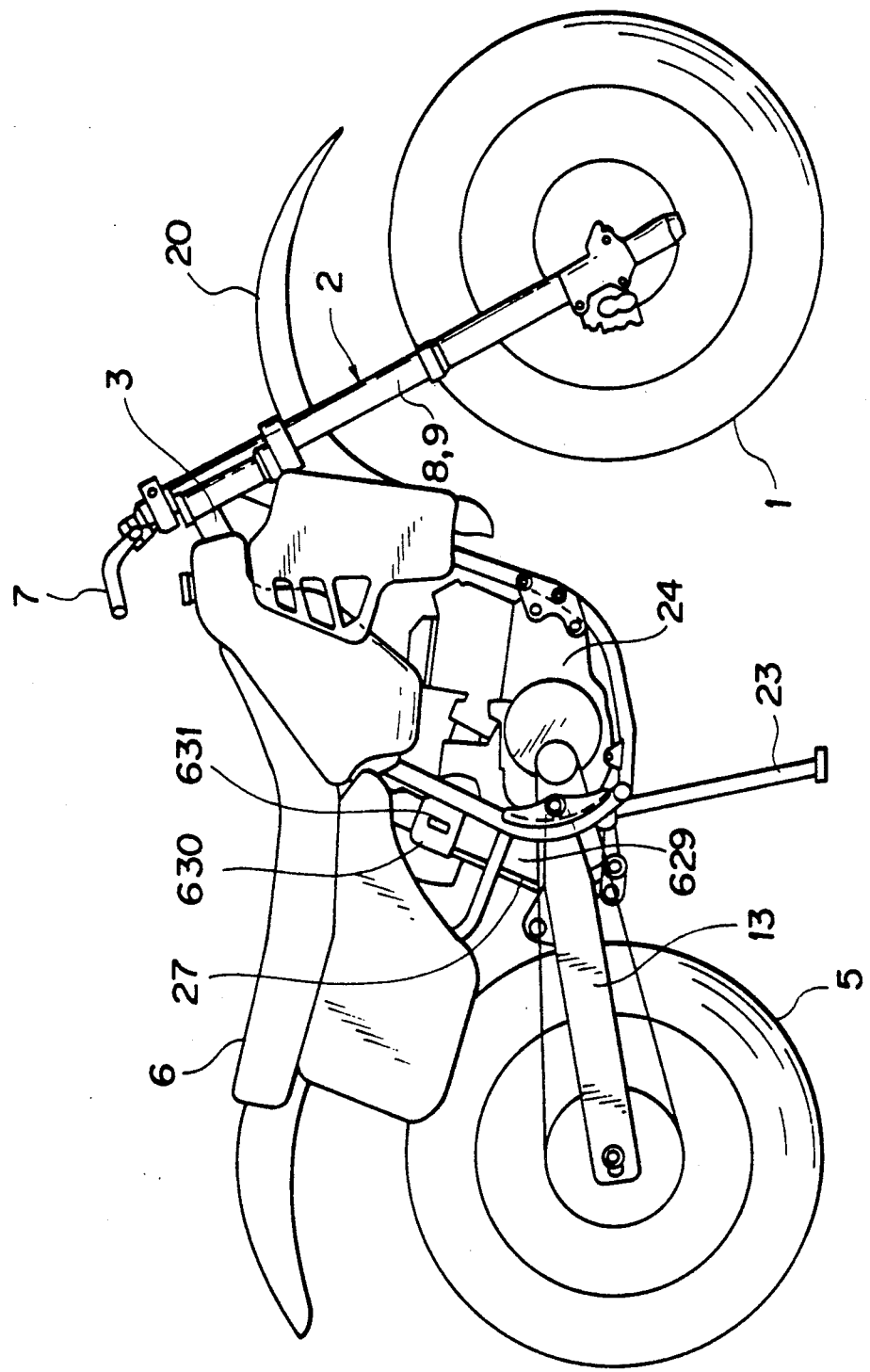
FIG. 24 is a side view of a motorcycle having a body height adjustor constructed in accordance with a sixth embodiment of the present invention.

FIG. 24 is a side view of a motorcycle having a body height adjustor constructed in accordance with a sixth embodiment of the present invention. Components of this embodiment identical or corresponding to those of the first embodiment ar indicated by means of the same reference symbols, and the description for them will not be repeated.

In the motorcycle constructed in accordance with the sixth embodiment, as shown in FIG. 24, the front fork 2 for supporting the front wheel 1 comprises front suspensions 8 and 9 each constituted by means of a front coil spring and a front oil damper, and a rear cushion unit 629 which is constituted by means of a rear coil spring 27 and a rear oil damper 26, it comprises a monosuspension, and is interposed between the body frame 3 and the swing arm 13 for supporting the rear wheel 5.

Figures 25, 26:
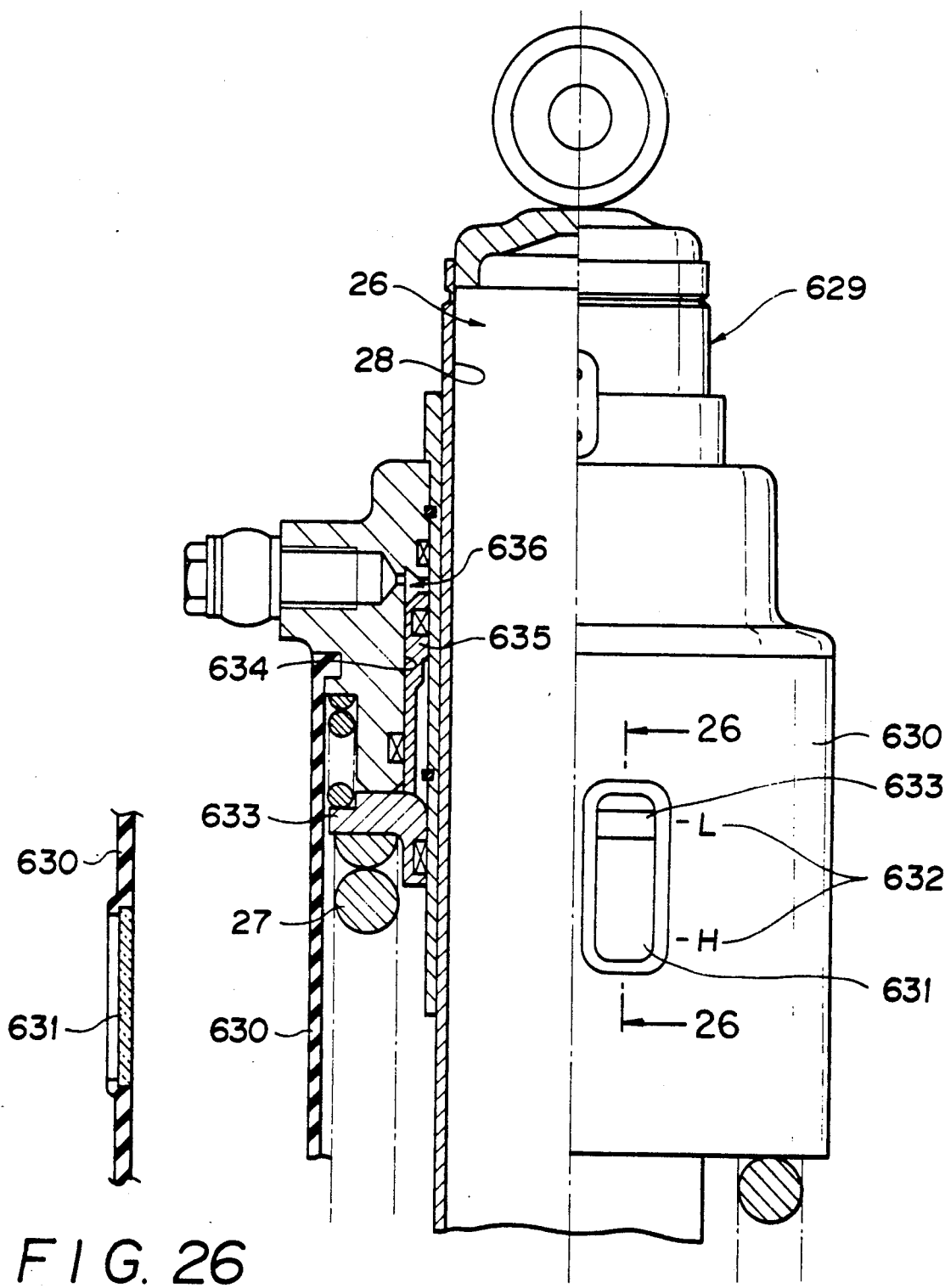
FIG. 25 is an enlarged cross-sectional view of an upper portion of the rear cushion unit shown in FIG. 24.
FIG. 26 is a cross-sectional view taken along the line 26—26 of FIG. 25.

FIG. 25 shows an upper portion of the rear cushion unit 629. A cylinder 28 of the rear oil damper 26 is formed at the center thereof, and an upper end of the rear coil spring 27 wound around the cylinder 28 engages a spring guide 633 which is disposed around the outer periphery of the cylinder 28 and which is slidable in the axial direction of the cylinder 28. A rear hydraulic jack 636 constituted by means of a cylinder 634 and an annular piston 635 is disposed within an upper portion of the cylinder 28. The lower end of the piston 635 engages the spring guide 633. The spring guide 33 and the upper end of the rear coil spring 27 are moved downwardly or upwardly by means of the supply or discharge of the hydraulic pressure to or from the rear hydraulic jack 636, and the rear cushion unit 629 is thereby expanded or contracted, thereby adjusting the body height of the motorcycle to a higher or lower height level.

An outer peripheral portion of the rear hydraulic jack 636 is covered by means of a dust cover 630 formed of rubber or the like. Ordinarily, the side stand 23 is provided upon the right hand side of the motorcycle as viewed from the front of the motorcycle. A transparent window 631 is formed within a side portion of the dust cover 630 upon the side of the motorcycle body remote from the side stand 23, that is, upon the left hand side of the motorcycle as viewed from the front of the motorcycle. Indication marks 632 are printed or inscribed within the surface of the dust cover 630 within the vicinity of the window 631. The outer peripheral portion of the spring guide 633 can be seen through the transparent window 631. It is thereby possible to easily discriminate at a glance whether the motorcycle body is in the high position H or low position L.

Consequently, the sixth embodiment has the following effects along with those of the first embodiment. Since transparent window 631 faces upwardly by being inclined when the side stand 23 is used, the inside of the window 631 can be easily seen in this state. Ordinarily, the rear cushion unit 629 is disposed within an inner space of the motorcycle body and is not easy to see because it is a non-suspension unit. However, the arrangement of this embodiment makes it easy to see the inside of the transparent window 631 and to determine the body height of the motorcycle because the window 631 faces upwardly as described above.

Since the adjustment of the body height adjusting unit to the low position is effected by means of the weight of the motorcycle body and since only an initial pressure is applied to the reserve tank 31, there is a possibility of failure to effect the adjusting operation due to a reduction in the force applied by means of the weight of the motorcycle body to the hydraulic jacks 42 and 636 if the motorcycle body is prematurely inclined with the side stand 23 extended and, hence, a possibility of the motorcycle standing in the high level position even if the spool valve 39 has been changed over to the low position. There is also a possibility of the motorcycle standing in the high level position due to a simple omission of the desired operation. However, an omission of adjustment or an adjustment error as described above can be easily found by observation through the transparent window 631, and the motorcycle body can therefore be set in the lower height or level position by re-adjustment, of, for example, the adjusting operation member 40 and the spool valve 39 operatively associated therewith, so as to achieve a stabilized standing attitude.

Obviously, many modifications and variations of the present invention are possible in light of the above teachings. It is therefore to be understood that within the scope of the appended claims, the present invention may be practiced otherwise than as specifically described herein.

What is claimed is:

1. A motorcycle having a body being adjustable in height, comprising:
    a front fork supported axially and rotatably on a body frame, said front fork supporting a front wheel in a shock absorbing manner by a pair of front suspensions;
    a rear cushion unit supported on said body frame, said rear cushion unit supporting a rear wheel in a shock absorbing manner;
    an engine mounted on said body frame to drive and rotate said rear wheel; and
    a body height adjustor capable of adjusting the body height of the motorcycle by changing the lengths of said front suspensions and said rear cushion unit, said body height adjustor including:
    a first hydraulic jack provided on said rear cushion unit to enable body height adjustment;
    second hydraulic jacks provided on said front suspensions to enable body height adjustment; and
    a body height adjusting unit capable of transmitting a hydraulic pressure of a pressure fluid in said rear cushion unit to said first and second hydraulic jacks through hydraulic hoses, said body height adjusting unit having an adjusting operation member for simultaneously transmitting the hydraulic pressure of the pressure fluid to said first and second hydraulic jacks.

2. A motorcycle having a body being adjustable in height according to claim 1, wherein an exhaust pipe extending from said engine is mounted on said body frame, and said body height adjusting unit is placed in a position opposite to that of said exhaust pipe with respect to said body frame.

3. A motorcycle having a body being adustable in height according to claim 1, wherein said body height adjustor is disposed in the vicinity of said rear cushion unit.

4. A motorcycle having a body being adjustable in height according to claim 1, wherein said adjusting operation member of said body height adjusting unit is provided on an adjusting unit body, said adjusting operation member being located on one side of said adjusting unit body corresponding to the outer side of the motorcycle.

5. A motorcycle as set forth in claim 1, wherein:
said body height adjusting unit is mounted upon a seat pillar by means of a mounting bracket.

6. A motorcycle having a body being adjustable in height, comprising:
a front fork supported axially and rotatably on a body frame, said front fork supporting a front wheel in a shock absorbing manner by a pair of front suspensions;
a rear cushion unit supported on said body frame, said rear cushion unit supporting a rear wheel in a shock absorbing manner;
an engine mounted on said body frame to drive and rotate said rear wheel; and
a body height adjustor capable of adjusting the body height of the motorcycle by changing the lengths of said front suspensions and said rear cushion unit, said body height adjustor including:
a first hydraulic jack provided on said rear cushion unit to enable body height adjustment;
second hydraulic jacks provided on said front suspensions to enable body height adjustment;
a body height adjusting unit capable of transmitting a hydraulic pressure of a pressure fluid in said rear cushion unit to said first and second hydraulic jacks through hydraulic hoses; and
a hose connector provided on said hydraulic hoses connecting said body height adjusting unit and said second hydraulic jacks of said front suspensions, said hose connector being disposed at the rear of said front suspensions and in front of said body height adjusting unit.

7. A motorcycle having a body being adjustable in height according to claim 6, wherein said hose connector is fixed to said body frame by an attachment bracket which is fastened together with an engine suspension plate for attachment of said engine to said body frame.

8. A motorcycle having a body being adjustable in height, comprising:
a front fork supported axially and rotatably on a body frame, said front fork supporting a front wheel in a shock absorbing manner by a pair of front suspensions;
a rear cushion unit supported on said body frame, said rear cushion unit supporting a rear wheel in a shock absorbing manner;
an engine mounted on said body frame to drive and rotate said rear wheel; and
a body height adjustor capable of adjusting the body height of the motorcycle by changing the lengths of said front suspensions and said rear cushion unit, said body height adjustor including:
a first hydraulic jack provided on said rear cushion unit to enable body height adjustment;
second hydraulic jacks provided on said front suspensions to enable body height adjustment; and
a body height adjusting unit capable of transmitting a hydraulic pressure of a pressure fluid in said rear cushion unit to said first and second hydraulic jacks through hydraulic hoses;
wherein said hydraulic hoses connecting said body height adjusting unit and said second hydraulic jacks of said front suspensions are arranged by being led downward from the upper ends of said front suspensions along a line corresponding to the center of said front fork in the widthwise direction and by being led toward the rear end of the motorcycle to be connected to said body height adjusting unit.

9. A motorcycle having a body being adjustable in height according to claim 8, wherein said hydraulic hoses connecting said body height adjusting unit and said second hydraulic jacks of said front suspensions are arranged by being led downward in front of said front fork along a line corresponding to the center of said front fork in the widthwise direction.

10. A motorcycle having a body being adjustable in height according to claim 8, wherein said hydraulic hoses connecting said body height adjusting unit and said second hydraulic jacks of said front suspensions are arranged by being led downward at the rear of said front fork along a line corresponding to the center of said front fork in the widthwise direction.

11. A motorcycle having a body being adjustable in height, comprising:
a front fork supported axially and rotatably on a body frame, said front fork supporting a front wheel in a shock absorbing manner by a pair of front suspensions;
a rear cushion unit supported on said body frame, said rear cushion unit supporting a rear wheel in a shock absorbing manner;
an engine mounted on said body frame to drive and rotate said rear wheel;
a body height adjustor capable of adjusting the body height of the motorcycle by changing the lengths of said front suspensions and said rear cushion unit; and
an ignition switch capable of igniting said engine; said body height adjustor including:
a first hydraulic jack provided on said rear cushion unit to enable body height adjustment;
second hydraulic jacks provided on said front suspensions to enable body height adjustment; and
a body height adjusting unit capable of transmitting a hydraulic pressure of a pressure fluid in said rear cushion unit to said first and second hydraulic jacks through hydraulic hoses; said body height adjusting unit having a blow valve means capable of being opened by an increase in the pressure fluid in said first and second hydraulic jacks and said hydraulic hoses to discharge the pressure fluid from the first and second hydraulic jacks and said hydraulic hoses, said blow valve means being also capable of being opened by an operation of turning OFF said ignition switch.

12. A motorcycle having a body being adjustable in height according to claim 11, wherein a body height correction shaft for opening said blow valve means is connected to said blow valve means, and an ignition switch lever is connected to said ignition switch, said body height correction shaft and said ignition switch lever being operatively linked to each other.

13. A motorcycle having a body being adjustable in height according to claim 12, wherein a cam is formed on the outer peripheral surface of said body height correction shaft, and said body height correction shaft is rotatably disposed, said blow valve means being opened when said cam of said body height correction shaft and said blow valve means contact each other.

14. A motorcycle having a body being adjustable in height according to claim 12, wherein a correction lever is connected to said body height correction shaft, and said correction lever and said ignition lever are operatively linked to each other by a link cable.

15. A motorcycle as set forth in claim 1, wherein:
said blow valve means of said body height adjusting unit comprises spring biasing means normally maintaining said blow valve means closed and yet permitting said blow valve means to be opened by means of an increase in pressure of said pressurized fluid within said first and second hydraulic jacks and said hydraulic hoses so as to permit a discharge of said pressurized fluid from said first and second hydraulic jacks and said hydraulic hoses.

16. A motorcycle having a body being adjustable in height, comprising:
a front fork supported axially and rotatably supported on a body frame, said front fork supporting a front wheel in a shock absorbing manner by a pair of front suspensions;
a rear cushion unit supported on said body frame, said rear cushion unit supporting a rear wheel in a shock absorbing manner;
an engine mounted on said body frame to drive and rotate said rear wheel;
a body height adjustor capable of adjusting the body height of the motorcycle by changing the lengths of said front suspensions and said rear cushion unit; and
a handlebar fixed to the upper end of said front fork; said body height adjustor including:
a first hydraulic jack provided on said rear cushion unit to enable body height adjustment;
second hydraulic jacks provided on said front suspensions to enable body height adjustment;
a body height adjusting unit having a body height changeover valve capable of transmitting a hydraulic pressure of a pressure fluid in said rear cushion unit to said first and second hydraulic jacks through hydraulic hoses;
a body height position detector placed at said body height adjusting unit to detect operating positions of said body height changeover valve; and
a body height position indicator provided in a meter panel in the vicinity of said handlebar to indicate the present body height of the motorcycle by a signal supplied from said body height detector.

17. A motorcycle having a body being adjustable in height according to claim 16, wherein said body height position indicator is lighted when said body height position detector detects changeover of said body height changeover valve to the low position.

18. A motorcycle having a body being adjustable in height according to claim 16, wherein said body height position indicator has a low position lamp and a high position lamp, said low position lamp being lighted when said body height position detector detects changeover of said body height changeover valve to the low position, said high position lamp being lighted when said body height position detector detects changeover of said body height changeover valve to the high position.

19. A motorcycle having a body being adjustable in height, comprising:
a front fork supported axially and rotatably supported on a body frame, said front fork supporting a front wheel in a shock absorbing manner by a pair of front suspensions;
a rear cushion unit supported on said body frame, said rear cushion unit supporting a rear wheel in a shock absorbing manner;
an engine mounted on said body frame to drive and rotate said rear wheel;
a body height adjustor capable of adjusting the body height of the motorcycle by changing the lengths of said front suspensions and said rear cushion unit; and
a side stand attached to said body frame and capable of being set upright and being retracted; and
each of said front suspensions and said rear cushion unit being formed of a combination of a coil spring and a oil damper; said body height adjustor including:
a first hydraulic jack provided on said rear cushion unit to adjust the body height by moving the upper end of the coil spring of said rear cushion unit upward or downward;
second hydraulic jacks provided on said front suspensions to adjust the body height by moving the upper ends of the coil springs of said front suspensions upward or downward; and
a body height adjusting unit capable of transmitting a hydraulic pressure of a pressure fluid in said rear cushion unit to said first and second hydraulic jacks through hydraulic hoses;
wherein a see-through window is formed in a side portion of said first hydraulic jack of said rear cushion unit on the side of said rear cushion unit remote from said side stand so that the upper end of said coil spring can be seen through said see-through window.

20. A motorcycle having a body being adjustable in height according to claim 19, wherein at least one mark for detecting the body height relative to the upper end of said coil spring is formed on said rear cushion unit by the side of said see-through window.

* * * * *